US012764520B2

(12) United States Patent
Pan et al.

(10) Patent No.: US 12,764,520 B2
(45) Date of Patent: Oct. 13, 2026

(54) COMMUNICATION METHOD WITH REDUCED CAPABILITY INFORMATION AND COMMUNICATION APPARATUS

(71) Applicant: HUAWEI TECHNOLOGIES CO., LTD., Shenzhen (CN)

(72) Inventors: Qi Pan, Beijing (CN); Zhenglei Huang, Shenzhen (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 353 days.

(21) Appl. No.: 18/461,905

(22) Filed: Sep. 6, 2023

(65) Prior Publication Data

US 2023/0413039 A1 Dec. 21, 2023

Related U.S. Application Data

(63) Continuation of application No. PCT/CN2021/080479, filed on Mar. 12, 2021.

(51) Int. Cl.
*H04W 8/22* (2009.01)
*H04W 76/20* (2018.01)

(52) U.S. Cl.
CPC .......... *H04W 8/22* (2013.01); *H04W 76/20* (2018.02)

(58) Field of Classification Search
CPC .......... H04W 4/20; H04W 76/20; H04W 8/22
See application file for complete search history.

(56) References Cited

U.S. PATENT DOCUMENTS

| | | | | |
|---|---|---|---|---|
| 2021/0099991 | A1* | 4/2021 | Liu | H04W 72/51 |
| 2021/0195654 | A1* | 6/2021 | Lei | H04W 72/21 |
| 2021/0227451 | A1* | 7/2021 | Babaei | H04W 48/10 |
| 2021/0329513 | A1* | 10/2021 | Babaei | H04W 36/0085 |
| 2022/0312187 | A1* | 9/2022 | Khlass | H04W 48/20 |
| 2022/0312530 | A1* | 9/2022 | Turtinen | H04W 76/10 |
| 2022/0377798 | A1* | 11/2022 | Chien | H04L 1/1812 |
| 2023/0037839 | A1* | 2/2023 | Gupta | H04W 76/27 |
| 2023/0133172 | A1* | 5/2023 | Breuer | H04L 5/0041 370/329 |
| 2023/0188261 | A1* | 6/2023 | Awadin | H04L 1/1864 370/329 |
| 2023/0189271 | A1* | 6/2023 | Liu | H04W 76/10 455/452.1 |
| 2023/0232309 | A1* | 7/2023 | Fei | H04W 48/12 |

(Continued)

OTHER PUBLICATIONS

English translation of international search report (ISR) for PCT/CN2021/080479, mailed Dec. 1, 2021 (Year: 2021).*

(Continued)

*Primary Examiner* — Benjamin H Elliott, IV
(74) *Attorney, Agent, or Firm* — HAUPTMAN HAM, LLP

(57) ABSTRACT

A communication method includes obtaining, by a first network element, first reduced capability (REDCAP) information from a terminal apparatus, obtaining, by the first network element, second REDCAP information that is subscribed by the terminal apparatus, and determining, by the first network element based on the first REDCAP information and the second REDCAP information, whether to allow the terminal apparatus to use a service corresponding to the first REDCAP information.

12 Claims, 10 Drawing Sheets

(56) References Cited

U.S. PATENT DOCUMENTS

| | | | | |
|---|---|---|---|---|
| 2023/0284131 A1* | 9/2023 | Höglund | H04W 48/12 | 370/329 |
| 2023/0300723 A1* | 9/2023 | Jose | H04W 48/12 | 455/434 |
| 2023/0362787 A1* | 11/2023 | Ohlsson | H04W 48/18 | |
| 2023/0413039 A1* | 12/2023 | Pan | H04W 76/20 | |

OTHER PUBLICATIONS

"On potential UE complexity reduction features for RedCap"; Intel; 3GPP TSG RAN WG1 Meeting #103-E R1-2007947 e-Meeting, Oct. 26-Nov. 13, 2020 (Year: 2020).*
"Discussion on design principles and definition for RedCap device type"; CMCC; 3GPP TSG RAN WG1 #103-e R1-2008019 e-Meeting, Oct. 26-Nov. 13, 2020 (Year: 2020).*
"On RedCap device identification"; Panasonic; 3GPP TSG RAN WG1 Meeting #103-e R1-2008291 e-Meeting, , Oct. 26-Nov. 6, 2020 (Year: 2020).*
"Summary #4 on Framework and Principles for Reduced Capability"; NTT DoCoMo; 3GPP TSG RAN WG1 #103-e R1-2009732 e-Meeting, Oct. 26-Nov. 13, 2020 (Year: 2020).*
"Identification and Access Restrictions for RedCap UEs"; vivo et al.; 3GPP TSG-RAN WG2 Meeting #112-e R2-2009086 Electronic, Nov. 2-13, 2020 (Year: 2020).*
"On the definition of a RedCap device type"; MediaTek; 3GPP TSG-RAN WG2 Meeting #112e R2-2009115 Online, Nov. 2-13, 2020 (Year: 2020).*
"RedCap UE identification options"; NEC; 3GPP TSG-RAN WG2 #112e R2-2009817 Electronic meeting, Nov. 2-13, 2020 (Year: 2020).*
"Capability framework and constraining of RedCap UE"; Huawei et al.; 3GPP TSG RAN WG2 #112-e R2-2009933 Online, Nov. 2-13, 2020 (Year: 2020).*
"Discussion on the intended use cases for RedCap UEs"; LG Electronics; 3GPP TSG-RAN WG2 Meeting #112 electronic <R2-2010225> Online, Nov. 2-13, 2020 (Year: 2020).*
3GPP TSG-RAN2 #113e, R2-2100770, "Discussion on intended use cases for RedCap UEs", LG Electronics Inc., Electronic meeting, Jan. 25-Feb. 5, 2021, total 3 pages.
3GPP TR 38.875 V1.1.0 (Mar. 2021), 3rd Generation Partnership Project; Technical Specification Group Radio Access Network; Study on support of reduced capability NR devices (Release 17), total 135 pages.
3GPP TS 23.501 V16.7.0 (Dec. 2020), 3rd Generation Partnership Project; Technical Specification Group Services and System Aspects; System architecture for the 5G System (5GS); Stage 2 (Release 16), total 442 pages.
3GPP TS 23.502 V16.7.1 (Jan. 2021), 3rd Generation Partnership Project; Technical Specification Group Services and System Aspects; Procedures for the 5G System (5GS); Stage 2 (Release 16), total 603 pages.
International Search Report issued in corresponding International Application No. PCT/CN2021/080479, dated Dec. 1, 2021, pp. 1-9.
3GPP TR 38.875 V0.0.x (2020-yy), 3rd Generation Partnership Project; Technical Specification Group Radio Access Network; Study on support of reduced capability NR devices (Release 17), total 29 pages.
Chinese First Office Action issued in corresponding Chinese Application No. 202180081172.4, dated May 30, 2025, pp. 1-8.
"3rd Generation Partnership Project; Technical Specification Group Radio Access Network; Study on support of reduced capability NR devices(Release 17)", 3GPP Draft; RP-202706, 3rd Generation Partnership Project (3GPP), Mobile Competence Centre; 650, Route Deslucioles; F-06921 Sophia-Antipolis Cedex; France, Nov. 30, 2020 (Nov. 30, 2020), XP051963269.
Vivo et al.:"Identification and Access Restrictions for RedCap UEs", 3GPP Draft; R2-2006692, 3rd Generation Partnership Project (3GPP), Mobile Competence Centre; 650, Route Deslucioles; F-06921 Sophia-Antipolis Cedex; France, vol. RAN WG2, No. Electronic; Aug. 17, 2020-202008287 Aug. 2020 (Aug. 7, 2020), XP051911608.
Extended European Search Report issued in corresponding European Application No. 21929630.8, dated Jun. 11, 2024, pp. 1-12.

* cited by examiner

COMMUNICATION METHOD WITH REDUCED CAPABILITY INFORMATION AND COMMUNICATION APPARATUS

CROSS-REFERENCE TO RELATED APPLICATIONS

This application is a continuation of International Patent Application No. PCT/CN2021/080479, filed on Mar. 12, 2021, the disclosure of which is hereby incorporated by reference in its entirety

TECHNICAL FIELD

This application relates to the communication field, and more specifically, to a communication method and a communication apparatus.

BACKGROUND

A fifth generation (5G) radio technology is mainly used to resolve various use cases, and these use cases are classified into enhanced mobile broadband (enhanced mobile broadband, eMBB), ultra reliable low latency communication (ultra reliable low latency communication, URLLC), and massive machine type communication (massive machine type communication, mMTC). Nevertheless, there are other use cases between these main use cases, such as an industrial sensor network, video surveillance, and a wearable device. To effectively serve such use cases, an NR terminal with a weak function, that is, a reduced capability (reduced capability, REDCAP) terminal, is introduced. Compared with a normal NR terminal, the REDCAP terminal has lower costs and complexity, a smaller overall dimension, and a longer battery lifespan. For the REDCAP terminal, how to ensure that the terminal can use only a corresponding use case or service is a key problem currently faced.

SUMMARY

One or more embodiments of the present application provide a communication method and a communication apparatus, to help ensure that a corresponding terminal apparatus can use only a service corresponding to the terminal apparatus.

According to a first aspect, a communication method is provided. The method includes: A first network element obtains first REDCAP information from a terminal apparatus and subscribed second REDCAP information of the terminal apparatus, and determines, based on the first REDCAP information and the second REDCAP information, whether to allow the terminal apparatus to use a service corresponding to the first REDCAP information.

In some embodiments, the first network element is an access network device or a core network device.

According to the communication method provided in this application, the first network element may verify, by using the subscribed REDCAP information (that is, the second REDCAP information) of the terminal apparatus, whether REDCAP information (that is, the first REDCAP information) reported by the terminal apparatus can be used, to help ensure that the terminal apparatus uses only a service corresponding to the terminal apparatus.

With reference to the first aspect, in some embodiments of the first aspect, the first REDCAP information indicates a REDCAP access technology, and the second information indicates whether the terminal apparatus subscribes to the REDCAP access technology.

In at least these embodiments, whether to allow the terminal apparatus to use the service corresponding to the first REDCAP information refers to whether to allow the terminal apparatus to set up a connection to a network by using the REDCAP access technology. Based on at least these embodiments, the first network element may determine whether the terminal apparatus can set up the connection to the network by using the REDCAP access technology, to ensure that the terminal apparatus can set up the connection to the network only by using the access technology subscribed to by the terminal apparatus.

With reference to the first aspect, in some embodiments of the first aspect, the first REDCAP information indicates the REDCAP access technology and a first service type, and an access technology used for the first service type is the REDCAP access technology. The second REDCAP information indicates the REDCAP access technology and at least one service type, and an access technology used for the at least one service type is the REDCAP access technology.

In at least these embodiments, whether to allow the terminal apparatus to use the service corresponding to the first REDCAP information refers to whether to allow the terminal apparatus to use a service of the first service type by using the REDCAP access technology. Based on at least these embodiments, the first network element can determine whether the terminal apparatus can use the service of the first service type by using the REDCAP access technology, to ensure that the terminal apparatus can be used only for a service of the first service type in the REDCAP access technology.

With reference to the first aspect, in some embodiments of the first aspect, the first REDCAP information indicates a first-type REDCAP access technology, the second REDCAP information indicates at least one type of REDCAP access technology, and different types of REDCAP access technologies correspond to different service types. The first-type REDCAP access technology corresponds to the first service type.

In at least these embodiments, whether to allow the terminal apparatus to use the service corresponding to the first REDCAP information refers to whether to allow the terminal apparatus to use the first-type REDCAP access technology, whether to allow the terminal apparatus to use the service of the first service type by using the first-type REDCAP access technology, or whether to allow the terminal apparatus to use the service of the first service type. Based on at least these embodiments, the first network element can determine whether the terminal apparatus can use the first-type REDCAP access technology, to ensure that the terminal apparatus can be used only for the first-type REDCAP access technology.

With reference to the first aspect, in some embodiments of the first aspect, the first network element sends first indication information to the terminal apparatus. The first indication information indicates not to allow the terminal apparatus to use the service corresponding to the first REDCAP information, or indicates that the terminal apparatus cannot use the service corresponding to the first REDCAP information.

In some embodiments, the first indication information includes a cause value, and the cause value indicates a reason why the terminal apparatus is rejected.

With reference to the first aspect, in some embodiments of the first aspect, when the first network element is the access network device, that a first network element obtains first REDCAP information from a terminal apparatus includes: The first network element receives a radio resource control (radio resource control, RRC) message from the terminal apparatus, and the RRC message includes the first REDCAP information. Alternatively, the first network element receives radio capability information from the terminal apparatus, and determines the first REDCAP information based on the radio capability information. Alternatively, the first network element receives a first message from an access and mobility management network element, and the first message includes the first REDCAP information. Alternatively, the first network element receives radio capability information that is of the terminal apparatus and that is from an access and mobility management network element, and determines the first REDCAP information based on the radio capability information.

Based on any one of the foregoing manners, the first network element can obtain the first REDCAP information.

For example, the RRC message is an RRC connection setup request message.

With reference to the first aspect, in some embodiments of the first aspect, the first network element is an access network device in a second network in a process in which the terminal apparatus is handed over from a first network to the second network.

For example, the first network may be a fourth generation (4th generation, 4G) or a long term evolution (long term evolution, LTE) network, and the second network may be a fifth generation (5th generation, 5G) or a new radio (new radio, NR) network.

With reference to the first aspect, in some embodiments of the first aspect, that a first network element obtains first REDCAP information from a terminal apparatus includes: The first network element receives radio capability information that is of the terminal apparatus and that is from an access network device in the first network; and the first network element determines the first REDCAP information based on the radio capability information.

Further, before the first network element determines the first REDCAP information based on the radio capability information, the method further includes: The first network element receives REDCAP indication information sent by an access and mobility management network element in the second network. The REDCAP indication information indicates the first network element to determine the first REDCAP information based on the radio capability information.

Based on at least these embodiments, the first network element can determine, based on an indication of the access and mobility management network element in the second network, the first REDCAP information based on the radio capability information.

With reference to the first aspect, in some embodiments of the first aspect, that a first network element obtains subscribed second REDCAP information of the terminal apparatus includes: The first network element sends request information to the access and mobility management network element based on the first REDCAP information, and the request information is used for requesting the access and mobility management network element to obtain the second REDCAP information from a unified data management network element; and the first network element receives the second REDCAP information from the access and mobility management network element.

It should be understood that, when the first network element is the access network device in the second network, the access and mobility management network element is the access and mobility management network element in the second network.

With reference to the first aspect, in some embodiments of the first aspect, the first network element is the access and mobility management network element.

With reference to the first aspect, in some embodiments of the first aspect, that the first network element obtains the first REDCAP information includes: The first network element receives a non-access stratum (non-access stratum, NAS) message from the terminal apparatus, and the NAS message includes the first REDCAP information; or the first network element receives the first REDCAP information from the access network device.

With reference to the first aspect, in some embodiments of the first aspect, before the first network element receives the first REDCAP information from the access network device, the method further includes: The first network element sends radio capability information of the terminal apparatus to the access network device. The radio capability information is used for the access network device to determine the first REDCAP information.

With reference to the first aspect, in some embodiments of the first aspect, the first network element is an access and mobility management network element in the second network in the process in which the terminal apparatus is handed over from the first network to the second network.

With reference to the first aspect, in some embodiments of the first aspect, that the first network element obtains the first REDCAP information includes: The first network element receives the first REDCAP information from the access network device in the second network. The first REDCAP information is determined by the access network device in the second network based on the radio capability information that is of the terminal apparatus and that is from the access network device in the first network.

With reference to the first aspect, in some embodiments of the first aspect, before the first network element receives the first REDCAP information from the access network device in the second network, the method further includes: The first network element sends the REDCAP indication information to the access network device in the second network. The REDCAP indication information indicates the access network device in the second network to determine the first REDCAP information based on the radio capability information.

With reference to the first aspect, in some embodiments of the first aspect, the first network element is a session management network element.

With reference to the first aspect, in some embodiments of the first aspect, that the first network element obtains the first REDCAP information includes: The first network element receives the first REDCAP information from an access and mobility management network element.

With reference to the first aspect, in some embodiments of the first aspect, that the first network element obtains the second REDCAP information includes: The first network element sends request information to the unified data management network element based on the first REDCAP information, and the request information is used for requesting the second REDCAP information; and the first network element receives the second REDCAP information from the unified data management network element.

With reference to the first aspect, in some embodiments of the first aspect, the second REDCAP information further indicates service feature information corresponding to the at least one service type.

With reference to the first aspect, in some embodiments of the first aspect, the method further includes: The first network element sends third indication information to the terminal apparatus. The third indication information indicates one or more of the following: indicates the terminal apparatus to store a timing advance (timing advance, TA) value used in a current RRC connection setup process, and use the timing advance value during a next RRC connection setup; indicates the terminal apparatus to reduce a frequency of neighboring cell measurement; or indicates the terminal apparatus to store transmit power used in a current RRC connection setup process, and use the transmit power during a next RRC connection setup.

For example, when service feature information corresponding to the first service type is a fixed location of the terminal apparatus or when the terminal apparatus is used in a video surveillance scenario, the first network element may send the third indication information, and optimize a method such as random access, radio resource management, or power control of the terminal apparatus by using the third indication information.

With reference to the first aspect, in some embodiments of the first aspect, the method further includes: The first network element sends broadcast information. The broadcast information includes REDCAP access technology indication information and optimization indication information, the optimization information indication indicates whether a terminal apparatus whose access technology is a first radio access technology enables an optimization function based on the optimization indication information, and the optimization function includes one or more of the following: storing the timing advance TA value used in the current RRC connection setup process, and using the TA value during the next RRC connection setup; reducing the frequency of neighboring cell measurement; or storing the transmit power used in the current RRC connection setup process, and using the transmit power during the next RRC connection setup.

For example, when the service feature information corresponding to the first service type is the fixed location of the terminal apparatus or when the terminal apparatus is used in the video surveillance scenario, the first network element may send the broadcast information, and optimize the method such as random access, radio resource management, or power control of the terminal apparatus by using the broadcast information.

According to a second aspect, a communication method is provided. The method includes: A terminal apparatus sends first REDCAP information; and the terminal apparatus receives indication information sent by a first network element based on the first REDCAP information. The indication information indicates whether to allow the terminal apparatus to use a service corresponding to the first REDCAP information.

According to the communication method provided in this application, the first network element can verify, by using subscribed REDCAP information of the terminal apparatus, whether the first REDCAP information can be used, to help ensure that the terminal apparatus can use only a service corresponding to the terminal apparatus.

With reference to the second aspect, in some embodiments of the second aspect, the method further includes: The terminal apparatus sends adjusted REDCAP information based on the indication information. The adjusted REDCAP information is different from the first REDCAP information.

With reference to the second aspect, in some embodiments of the second aspect, that a terminal apparatus sends first REDCAP information includes: The terminal apparatus sends radio capability information. The radio capability information determines the first REDCAP information.

With reference to the second aspect, in some embodiments of the second aspect, the first network element is an access network device.

With reference to the second aspect, in some embodiments of the second aspect, the method further includes: The terminal apparatus receives third indication information from the first network element. The third indication information indicates one or more of the following: indicates the terminal apparatus to store a timing advance TA value used in a current RRC connection setup process, and use the TA value during a next RRC connection setup; indicates the terminal apparatus to reduce a frequency of neighboring cell measurement; or indicates the terminal apparatus to store transmit power used in a current RRC connection setup process, and use the transmit power during the next RRC connection setup.

With reference to the second aspect, in some embodiments of the second aspect, the method further includes: The terminal apparatus receives broadcast information from the first network element. The broadcast information includes REDCAP access technology indication information and optimization indication information, the optimization information indication indicates whether a terminal apparatus whose access technology is a REDCAP access technology enables an optimization function based on the optimization indication information, and the optimization function includes one or more of the following: storing the timing advance TA value used in the current RRC connection setup process, and using the TA value during the next RRC connection setup; reducing the frequency of neighboring cell measurement; or storing the transmit power used in the current RRC connection setup process, and using the transmit power during the next RRC connection setup.

According to a third aspect, a communication system is provided. The system includes a first network element and a second network element. The second network element sends first REDCAP information of a terminal apparatus to the first network element; the first network element obtains subscribed second REDCAP information of the terminal apparatus based on the first REDCAP information; and the first network element determines, based on the first REDCAP information and the second REDCAP information, whether to allow the terminal apparatus to use a service corresponding to the first REDCAP information.

According to the communication system provided in this application, the first network element can verify, by using subscribed REDCAP information of the terminal apparatus, whether the first REDCAP information can be used, to help ensure that the terminal apparatus can use only a service corresponding to the terminal apparatus.

With reference to the third aspect, in some embodiments of the third aspect, the second network element is an access and mobility management network element, and the first network element is an access network device. Alternatively, the second network element is an access network device, and the first network element is an access and mobility management network element. Alternatively, the second network element is an access and mobility management network element, and the first network element is a session management network element. Alternatively, the second network element is an access network device in a first network in a process in which the terminal apparatus is handed over from the first network to a second network, and the first network element is an access network device in the second network.

With reference to the third aspect, in some embodiments of the third aspect, the system further includes a unified data management network element; and that the first network element obtains subscribed second REDCAP information of the terminal apparatus based on the first REDCAP information includes: The first network element obtains the second REDCAP information from the unified data management network element based on the first REDCAP information.

According to a fourth aspect, a communication apparatus is provided, the apparatus includes modules or units configured to perform the method according to any one of the first aspect and the second aspect or the possible embodiments of the first aspect and the second aspect.

According to a fifth aspect, an apparatus is provided. The apparatus includes a processor. The processor is coupled to a memory, and may be configured to execute instructions in the memory, to enable the apparatus to perform the method according to any one of the first aspect and the second aspect or the possible embodiments of the first aspect and the second aspect. In some embodiments, the apparatus further includes the memory. In some embodiments, the apparatus further includes an interface circuit, and the processor is coupled to the interface circuit.

According to a sixth aspect, a processor is provided. The processor includes an input circuit, an output circuit, and a processing circuit. The processing circuit is configured to: receive a signal through the input circuit, and transmit a signal through the output circuit, to enable the processor to perform the method according to any one of the first aspect and the second aspect or the possible embodiments of the first aspect and the second aspect.

In a specific implementation process, the processor may be a chip, the input circuit may be an input pin, the output circuit may be an output pin, and the processing circuit may be a transistor, a gate circuit, a trigger, various logic circuits, and the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific embodiments of the processor and various circuits are not limited in embodiments of this application.

According to a seventh aspect, a processing apparatus is provided. The apparatus includes a processor and a memory. The processor is configured to read instructions stored in the memory, receive a signal by using a receiver, and transmit a signal by using a transmitter, to perform the method according to any one of the first aspect and the second aspect or the possible embodiments of the first aspect and the second aspect.

In some embodiments, there are one or more processors, and there are one or more memories.

In some embodiments, the memory may be integrated with the processor, or the memory and the processor are separately disposed.

In a specific implementation process, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in embodiments of this application.

The processing apparatus in the seventh aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to an eighth aspect, a computer program product is provided. The computer program product includes a computer program (which may also be referred to as code or instructions). When the computer program is run, a computer is enabled to perform the method according to any one of the first aspect and the second aspect or the possible embodiments of the first aspect and the second aspect.

According to a ninth aspect, a computer-readable medium is provided. The computer-readable medium stores a computer program (which may also be referred to as code or instructions). When the computer program is run on a computer, the computer is enabled to perform the method according to any one of the first aspect and the second aspect or the possible embodiments of the first aspect and the second aspect.

DETAILED DESCRIPTION

The following describes technical solutions of this application with reference to accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a fifth generation (5th generation, 5G) system, a new radio (new radio, NR) system, or another communication system that may appear in the future.

Figure 1:
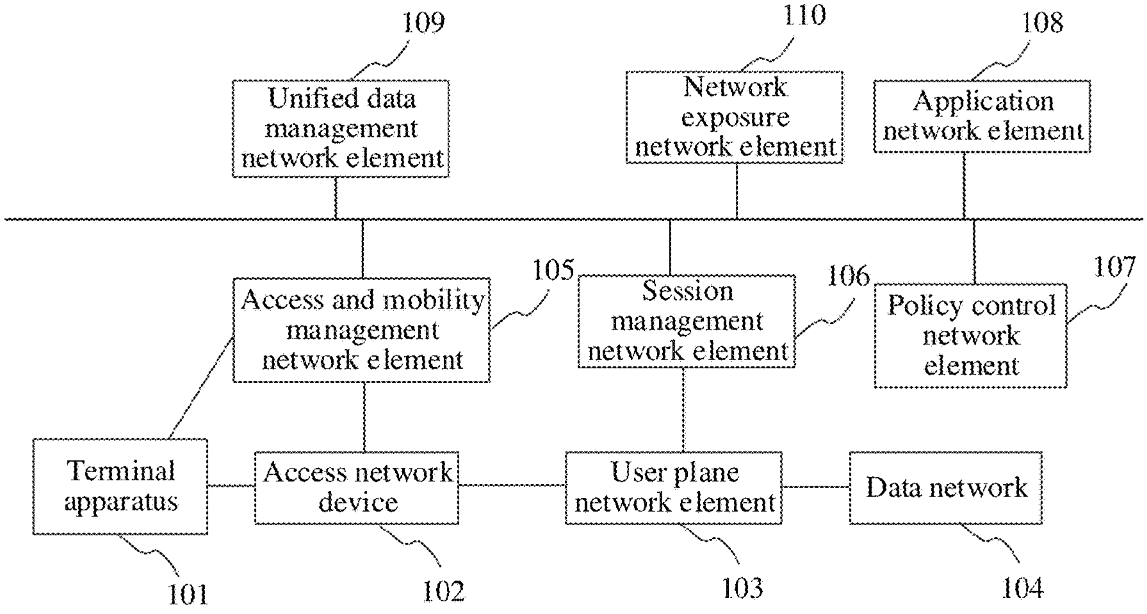
FIG. 1 is a schematic diagram of a communication system according to this application.

FIG. 1 is a diagram of an architecture of a system 100 that may be applied to this application. As shown in FIG. 1, the system 100 may include one or more of the following devices: a terminal apparatus 101, an access network device 102, a user plane network element 103, a data network 104, an access and mobility management network element 105, a session management network element 106, a policy control network element 107, an application network element 108, a unified data management network element 109, and a network exposure network element 110.

The terminal apparatus 101 may be user equipment (user equipment, UE), a user, an access terminal, a subscriber unit, a subscriber station, a mobile station, a remote station, a remote terminal, a mobile device, a user terminal, a terminal, a wireless communication device, a user agent, or a user apparatus. For example, the terminal apparatus 101 may be a mobile phone (mobile phone), a tablet computer (pad), a computer with a wireless transceiver function, a virtual reality (virtual reality, VR) terminal apparatus, an augmented reality (augmented reality, AR) terminal apparatus, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), and the like. The terminal apparatus 101 may alternatively be an apparatus or a circuit structure disposed in the foregoing various devices, for example, a chip or a chip system.

The terminal apparatus in this application may be a REDCAP terminal device, a low-capability terminal device, a reduced capability terminal device, a REDCAP UE, a reduced capacity UE, a narrow-band NR (narrow-band NR, NB-NR) UE, or the like.

In some embodiments, the terminal apparatus in this application has one or more of the following features:

1. Bandwidth capability. The bandwidth capability may be represented by a maximum bandwidth processing capability of a baseband. For example, bandwidth supported by the terminal apparatus in this application is not greater than 40 MHz.
2. Number of transmit and receive antennas. For example, the terminal apparatus in this application may support 2R1T (two receive antennas and one transmit antenna), or 1R1T (one receive antenna and one transmit antenna).
3. Maximum uplink transmit power. For example, the maximum uplink transmit power of the terminal apparatus in this application may be a value ranging from 4 dBm (dBm) to 20 dBm.
4. Protocol version. The terminal apparatus in this application may be a terminal apparatus in an NR release-17 (release-17, Rel-17) or a release later than NR Rel-17.
5. Carrier aggregation capability. For example, the terminal apparatus in this application does not support carrier aggregation, or supports carrier aggregation, but a maximum simultaneous carrier aggregation quantity supported by the terminal apparatus is less than a maximum simultaneous carrier aggregation quantity supported by a conventional-capability, normal-capability, or high-capability terminal apparatus (which may also be referred to as a legacy (legacy) terminal device or a normal (normal) terminal apparatus).
6. Duplex capability. For example, the terminal apparatus in this application supports half-duplex frequency division duplex (frequency division duplex, FDD).
7. Data processing time capability. For example, minimum latency between receiving downlink data and sending a feedback on the downlink data by the terminal apparatus in this application is greater than minimum latency between receiving downlink data and sending a feedback on the downlink data by the conventional-capability, normal-capability, or high-capability terminal apparatus; and/or minimum latency between sending uplink data and receiving a feedback on the uplink data by the terminal apparatus in this application is greater than minimum latency between sending uplink data and receiving a feedback on the uplink data by the conventional-capability, normal-capability, or high-capability terminal apparatus.
8. Processing capability (ability/capability). For example, a baseband processing capability of the terminal apparatus in this application is lower than a baseband processing capability of the conventional-capability, normal-capability, or high-capability terminal apparatus. The baseband processing capability may include at least one of the following: a maximum quantity of multiple input multiple output (multiple input multiple output, MIMO) layers supported by the terminal apparatus during data transmission, a quantity of hybrid automatic repeat request (hybrid automatic repeat request, HARQ) processes supported by the terminal apparatus, and a maximum transport block size (transport block size, TBS) supported by the terminal apparatus.
9. Uplink and/or downlink transmission peak rate. A transmission peak rate is a maximum data transmission rate that can be reached by a terminal device in a unit time (for example, per second). An uplink peak rate supported by the terminal apparatus in this application may be lower than an uplink peak rate supported by the conventional-capability, normal-capability, or high-capability terminal apparatus; and/or a downlink peak rate supported by the terminal apparatus in this application may be lower than a downlink peak rate supported by the conventional-capability, normal-capability, or high-capability terminal apparatus.
10. Buffer (buffer) size. A buffer may be understood as a total size of a layer 2 (Layer 2, L2) buffer, or a buffer may be understood as a total quantity of soft channel bits that can be used for HARQ processing.

The access network device 102 can manage a radio resource, provide an access service for the terminal apparatus, and further complete forwarding of a control signal and user data between the terminal apparatus and a core network.

The access network device may be a transmission reception point (transmission reception point, TRP), an evolved NodeB (evolved NodeB, eNB or eNodeB) in an LTE system, a home base station (for example, a home evolved NodeB or a home NodeB, HNB), a baseband unit (baseband unit, BBU), a radio controller in a cloud radio access network (cloud radio access network, CRAN) scenario, a relay station, an access point, a vehicle-mounted device, a wearable device, a next generation NodeB (next generation NodeB, gNB) in a 5G mobile communication system, and an access network device, an access point (access point, AP), and the like in a future evolved public land mobile network (public land mobile network, PLMN).

The user plane network element 103 is mainly responsible for routing and forwarding of a data packet.

The data network 104 may be a carrier service, an Internet access service, or a third-party service, for example, an IP multimedia service (IP multimedia service, IMS) or the Internet. The data network may include an application server (application server, AS). The AS is a software framework, provides an environment in which an application program is run, and is configured to provide the application program with services such as security, data, transaction support, load balancing, and large-scale distributed system management. The terminal apparatus obtains an application packet by communicating with the AS.

The access and mobility management network element 105 is mainly responsible for mobility management in a mobile network, for example, user location update, user network registration, and user handover.

The session management network element 106 is mainly responsible for session management in the mobile network, for example, session establishment, modification, and release. Specific functions may be, for example, allocating an IP address to a user and selecting a user plane network element that provides a packet forwarding function.

The policy control network element 107 is responsible for providing a policy such as a quality of service (quality of service, QoS) policy and a slice selection policy for the access and mobility management network element and the session management network element.

The application network element 108 is responsible for providing a service for a 3GPP network, interacting with the policy control network element to perform policy control, and the like.

The unified data management network element 109 is configured to store user data, such as subscription information and authentication/authorization information.

The network exposure network element 110 provides a framework, authentication, and an interface that are related to network capability exposure, and transfers information between a system network function and another network function.

It should be understood that the foregoing devices or network elements may be apparatuses with corresponding functions, or may be software/hardware modules (for example, chips) inside the apparatuses, or the like. It should be further understood that any device or network element in this application may be implemented in a form of software or a combination of software and hardware.

Figure 2:
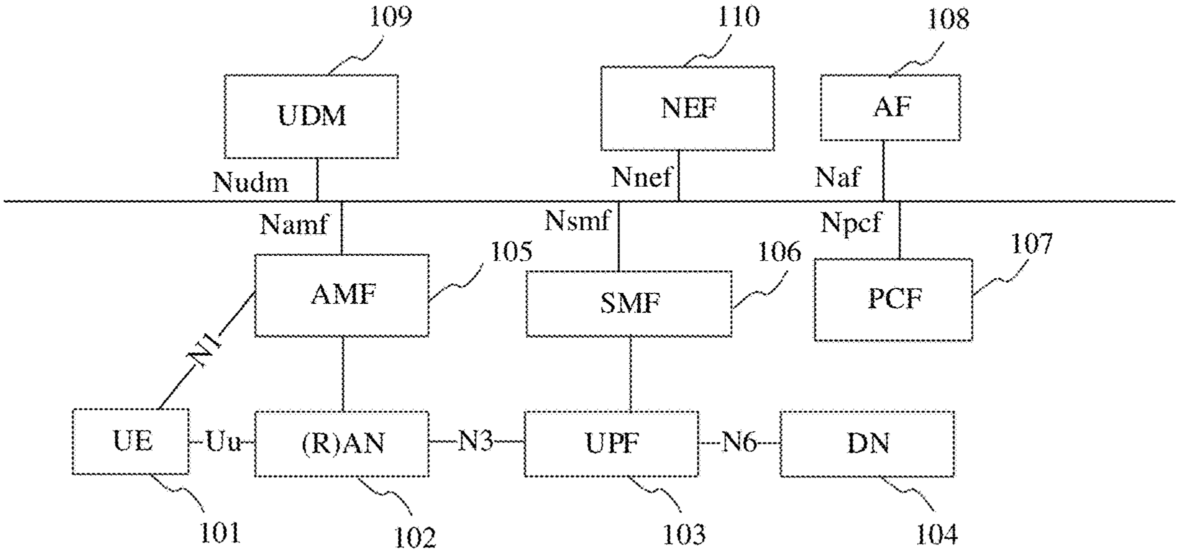
FIG. 2 is a schematic diagram of another communication system according to this application.

In an example, the system 100 shown in FIG. 1 may be a 5G system shown in FIG. 2. It should be understood that the system 100 may alternatively be a 4G system or another system. This is not limited in this application.

FIG. 2 is a schematic diagram of an architecture of a 5G system. In the diagram of the architecture of the system, a network element whose reference numeral is the same as that in FIG. 1 is a name of a corresponding network element in FIG. 1 in a current 5G system. Refer to FIG. 2. The architecture of the 5G system may include one or more of the following network elements: UE 101, a (radio) access network ((radio) access network, (R)AN) 102, a user plane function (user plane function, UPF) 103, a data network (data network, DN) 104, an access and mobility management function (access and mobility management function, AMF) 105, a session management function (session management function, SMF) 106, a policy control function (policy control function, PCF) 107, an application function (application function, AF) 108, a unified data management (unified data management, UDM) 109, and a network exposure function (network exposure function) 110.

It should be understood that a name of each network element shown in FIG. 2 is merely a name, and the name constitutes no limitation on a function of the network element. In different networks, the foregoing network elements may alternatively have other names. This is not specifically limited in embodiments of this application. For example, in a 6G network, some or all of the foregoing network elements may still use terms in 5G, or may use other names. Similarly, interfaces between the network elements shown in FIG. 2 are merely examples. In a 5G network and another future network, interfaces between network elements may alternatively not be the interfaces shown in the figure. This is not limited in this application.

It should be further understood that embodiments of this application are not limited to the architecture of the system shown in FIG. 2. For example, a communication system to which this application may be applied may include more or fewer network elements or devices. The devices or network elements in FIG. 2 may be hardware, or may be software obtained through function division or a combination of the hardware and the software. The devices or network elements in FIG. 2 may communicate with each other by using another device or network element.

A 5G radio technology is mainly used to resolve various use cases, and these use cases are classified into enhanced mobile broadband (eMBB), ultra reliable low latency communication (URLLC), and massive machine type communication (mMTC). Nevertheless, there are other use cases in these main use cases, such as an industrial sensor network, video surveillance, and a wearable device. To effectively serve such use cases, an NR terminal with a weak function, that is, a reduced capability (reduced capability, REDCAP) terminal, is introduced. Compared with a normal NR terminal, the REDCAP terminal has lower costs and complexity, a smaller overall dimension, and a longer battery lifespan. For the REDCAP terminal, how to ensure that the terminal can use only a corresponding use case or service is a key problem currently faced.

In view of this, this application provides a communication method. An access network device or a core network device can determine whether a terminal apparatus can use a service corresponding to REDCAP information (that is, first REDCAP information) reported by the terminal apparatus, to help ensure that the terminal apparatus can use only a service corresponding to the terminal apparatus. The following describes the solution provided in this application.

Figure 3:
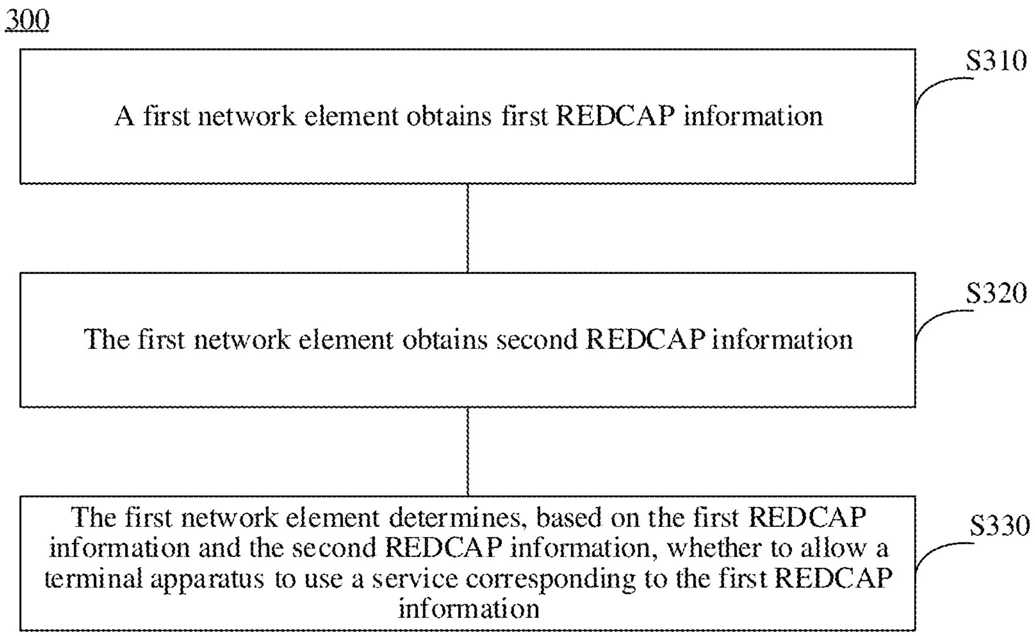
FIG. 3 is a schematic flowchart of a communication method according to this application.

FIG. 3 is a schematic flowchart of a communication method according to this application. A method 300 may include steps S310 to S330. The following describes the steps.

S310. A first network element obtains REDCAP information from a terminal apparatus, that is, first REDCAP information.

In this application, the first REDCAP information may be actively sent by another network element to the first network element, may be sent by another network element to the first network element after the another network element receives a request of the first network element, or may be determined by the first network element. The following methods 400 to 800 provide descriptions by using examples.

S320. The first network element obtains subscribed REDCAP information of the terminal apparatus, that is, second REDCAP information.

The first network element may obtain subscribed information of the terminal apparatus from a unified data management network element. The subscribed information of the terminal apparatus includes the second REDCAP information. Alternatively, the first network element may obtain the second REDCAP information in subscribed information of the terminal apparatus from a unified data management network element. The second REDCAP information may be information that is already stored in the unified data management network element during subscription of the terminal apparatus, or may be sent by an application network element to the unified data management network element through a capability exposure interface.

S330. The first network element determines, based on the first REDCAP information and the second REDCAP information, whether to allow the terminal apparatus to use a service corresponding to the first REDCAP information.

In a first implementation, the first REDCAP information indicates a REDCAP access technology. Correspondingly, the second REDCAP information indicates an access technology to which the terminal apparatus subscribes, or the second REDCAP information indicates whether the terminal apparatus subscribes to the REDCAP access technology.

If the access technology to which the terminal apparatus subscribes includes the REDCAP access technology, or the terminal apparatus subscribes to the REDCAP access technology, the terminal apparatus is allowed to use the service corresponding to the first REDCAP information, that is, the terminal apparatus is allowed to set up a connection to a network by using the REDCAP access technology. If the access technology to which the terminal apparatus subscribes does not include the REDCAP access technology, or the terminal apparatus does not subscribe to the REDCAP access technology, the terminal apparatus is not allowed to use the service corresponding to the first REDCAP information, that is, the terminal apparatus is not allowed to set up the connection to the network by using the REDCAP access technology.

In the first implementation and a second implementation in the following, REDCAP access is a "simply-configured" version NR technology, namely, reduced capability NR, performed by 5G NR to adapt to network access of massive Internet of Things terminals, and aims to meet a network connection requirement of an Internet of Things terminal apparatus in three scenarios: video surveillance, an industrial sensor network, and a wearable device, or a similar requirement in another scenario. In other words, in the first implementation and the second implementation in the following, it may be considered that REDCAP terminals corresponding to different scenarios or different use cases may all set up a connection to the network by using the REDCAP access technology. For example, a REDCAP terminal corresponding to a video surveillance scenario, a REDCAP terminal corresponding to the industrial sensor network, and a REDCAP terminal (namely, the wearable device) corresponding to a wearable scenario may all set up a connection to the network by using the REDCAP access technology.

For example, the terminal apparatus is the wearable device, and when the wearable device subscribes to the REDCAP access technology, the wearable device may be allowed to set up a connection to the network by using the REDCAP access technology. If an access technology to which the wearable device subscribes is Narrowband Internet of Things (Narrowband Internet of Things, NB-IoT), the wearable device is not allowed to set up a connection to the network by using the REDCAP access technology.

In the second implementation, the first REDCAP information indicates the REDCAP access technology and a first service type. An access technology used for the first service type is the REDCAP access technology. Correspondingly, the second REDCAP information indicates the REDCAP access technology and at least one service type. An access technology used for the at least one service type is the REDCAP access technology.

If the at least one service type includes the first service type, the terminal apparatus is allowed to use the service corresponding to the first REDCAP information, that is, the terminal apparatus is allowed to access a service of the first service type by using the REDCAP access technology. If the at least one service type does not include the first service type, the terminal apparatus is not allowed to use the service corresponding to the first REDCAP information, that is, the terminal apparatus is not allowed to access the service of the first service type by using the REDCAP access technology.

For example, if the first service type is a video surveillance service, and the at least one service type includes the video surveillance service, the terminal apparatus is allowed to access the video surveillance service by using the REDCAP access technology. If the first service type is video surveillance, and the at least one service type is a wearable service, the terminal apparatus is not allowed to access the video surveillance service by using the REDCAP access technology.

In a third implementation, the first REDCAP information indicates a first-type REDCAP access technology, and correspondingly, the second REDCAP information indicates at least one type of REDCAP access technology. Different types of REDCAP access technologies correspond to different service types.

If the at least one type of REDCAP access technology includes the first-type REDCAP access technology, the terminal apparatus is allowed to use the service corresponding to the first REDCAP information, that is, the terminal apparatus is allowed to access, by using the first-type REDCAP access technology, a service corresponding to the first-type REDCAP access technology. If the at least one type of REDCAP access technology does not include the first-type REDCAP access technology, the terminal apparatus is not allowed to use the service corresponding to the first REDCAP information, that is, the terminal apparatus is not allowed to access, by using the first-type REDCAP access technology, the service corresponding to the first-type REDCAP access technology.

In this implementation, it may be considered that different scenarios or different use cases correspond to different REDCAP access technologies, or it may be considered that different REDCAP access technologies indicate different scenarios or use cases. For example, the first-type REDCAP access technology corresponds to the video surveillance scenario, a second-type REDCAP access technology corresponds to the industrial sensor network, and a third-type REDCAP access technology corresponds to the wearable scenario. A REDCAP terminal used in the video surveillance scenario, such as a surveillance camera, may use the first-type REDCAP access technology, a REDCAP terminal used in the industrial sensor network, such as a temperature sensor or a pressure sensor, may use the second-type REDCAP access technology, and the wearable device such as a smart band or a smart watch may use the third-type REDCAP access technology.

For example, when the terminal apparatus is the surveillance camera, and the surveillance camera subscribes to the first-type REDCAP access technology, the terminal apparatus is allowed to access the video surveillance service by using the first-type REDCAP access technology.

In this application, a service, a service type, a scenario, a use case, and use case (use case) information are interchangeable.

According to the method provided in this application, the terminal apparatus may report an access technology and/or a service type to the first network element (an access network device or a core network device). The first network element verifies, by using the subscribed information of the terminal apparatus, the access technology and/or the service type reported by the terminal apparatus, to determine whether the terminal apparatus can use the access technology and/or the service type reported by the terminal apparatus. This helps ensure that the terminal apparatus can use only a service corresponding to the terminal apparatus.

In the foregoing solution, the first network element may be the access network device or may be the core network device. The following separately describes in detail the technical solutions provided in this application by using examples in which the first network element is the access network device, an access and mobility management network element, a session management network element, an access network device in a second network in a process in which the terminal apparatus is handed over from a first network to the second network, and an access and mobility management network element in the second network in the process in which the terminal apparatus is handed over from the first network to the second network.

Figure 4A:
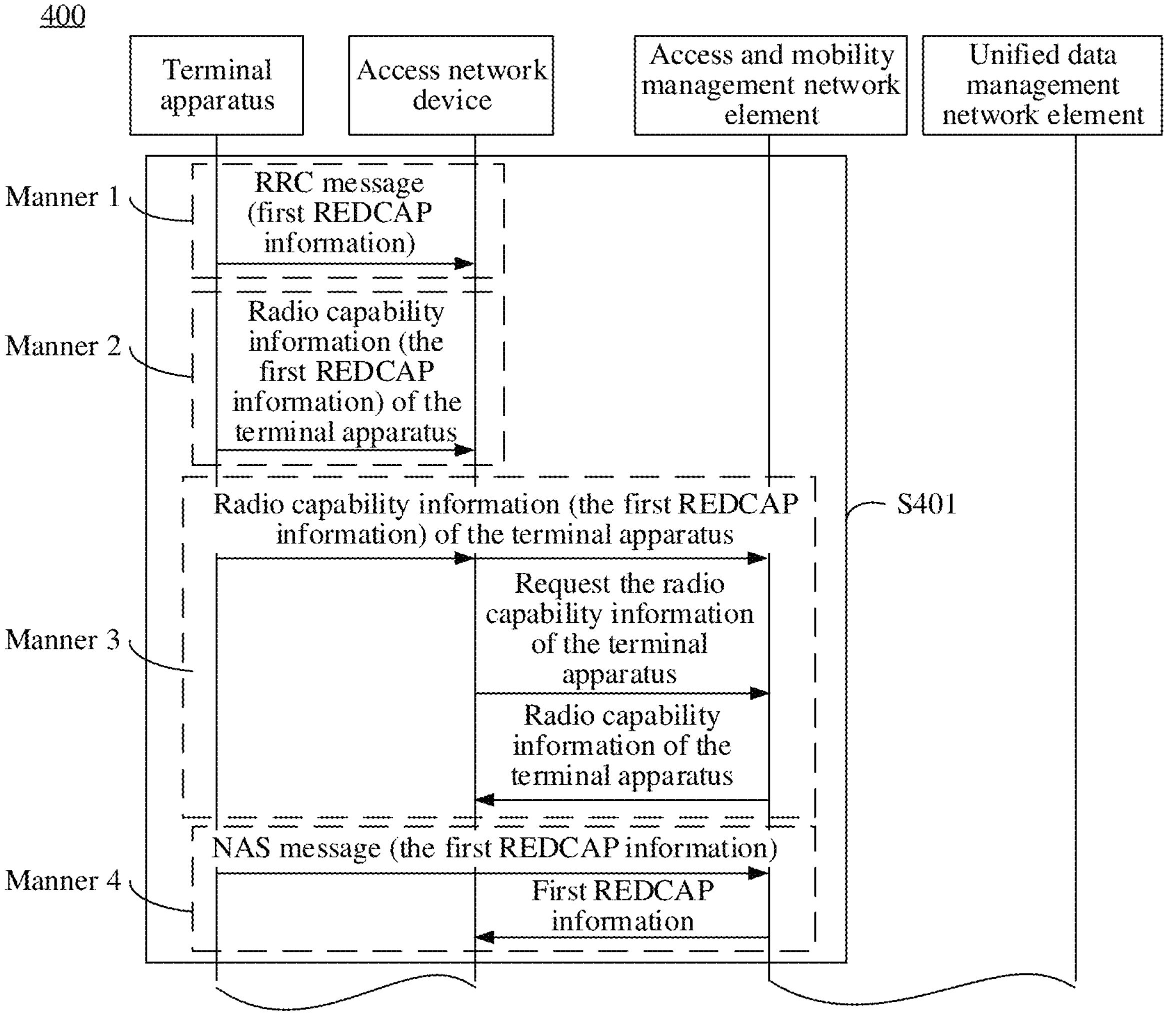
FIG. 4A and FIG. 4B are a schematic flowchart of another communication method according to this application.
Figure 4B:
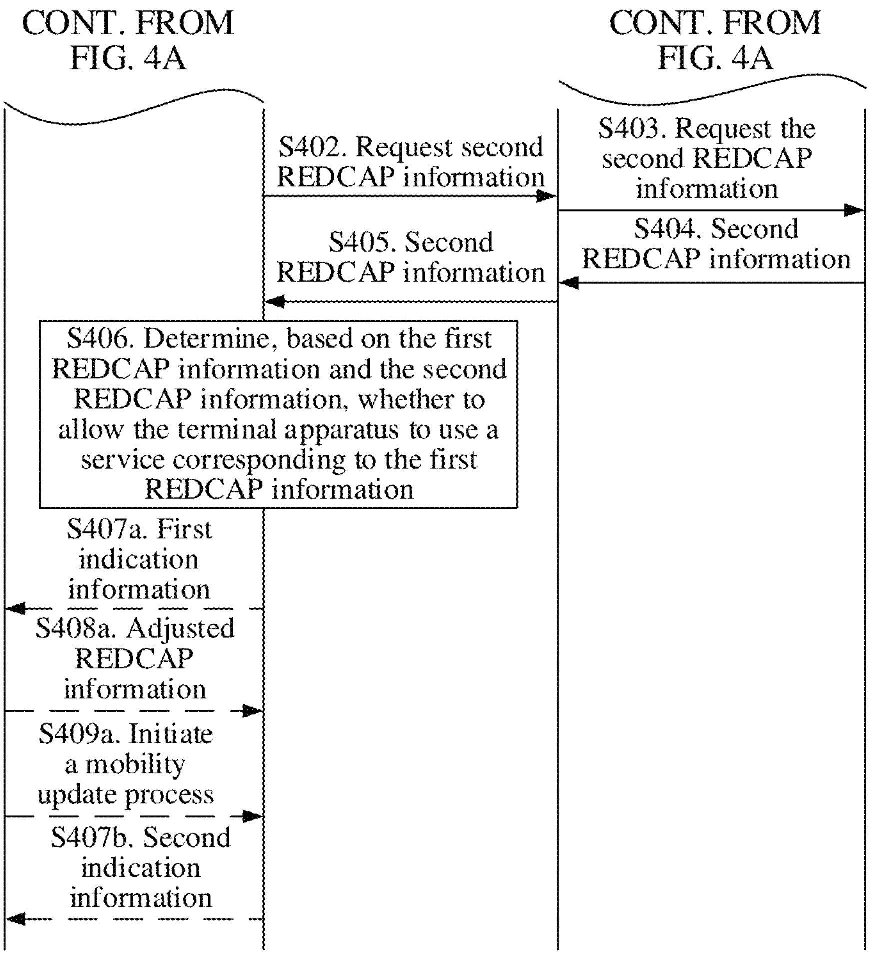

FIG. 4A and FIG. 4B are a schematic flowchart of a communication method according to this application. A method 400 is an example in which a first network element is an access network device. The following describes the method 400.

S401. An access network device obtains first REDCAP information.

The access network device may obtain the first REDCAP information in a plurality of manners. The following uses an example for description.

Manner 1

A terminal apparatus may include the first REDCAP information in an RRC message sent to the access network device.

For example, the RRC message is an RRC connection setup request message.

Manner 2

The terminal apparatus may send radio capability information of the terminal apparatus to the access network device, and the access network device may determine the first REDCAP information based on the radio capability information. For example, the radio capability information may carry the first REDCAP information. Alternatively, the access network device may determine the first REDCAP information based on a parameter in the radio capability information. For example, the access network device may determine, based on a parameter such as a corresponding access frequency in the radio capability information, REDCAP information used for the terminal apparatus, and use the REDCAP information as the first REDCAP information.

For example, this manner may be applied to a case in which the terminal apparatus is registered during startup for the first time.

Manner 3

The terminal apparatus may send the radio capability information of the terminal apparatus to the access network device, and the access network device may send the radio capability information to an access and mobility management network element. After an RRC connection is set up between the terminal apparatus and the access network device, the access network device may request the radio capability information from the access and mobility management network element. After receiving a request of the access network device, the access and mobility management network element returns the radio capability information to the access network device. The access network device may determine the first REDCAP information based on the radio capability information. For how the access network device determines the first REDCAP information based on the radio capability information, refer to the descriptions in Manner 2. Details are not described herein again.

For example, in this application, the access and mobility management network element may place the radio capability information of the terminal apparatus in a container (container), and store only the radio capability information of the terminal apparatus, but does not view content of the radio capability information of the terminal apparatus.

Manner 4

The terminal apparatus may send the first REDCAP information to the access and mobility management network element by using a NAS message, and the access and mobility management network element may send the received first REDCAP information to the access network device. For example, after receiving the NAS message, the access and mobility management network element may actively send the first REDCAP information in the NAS message to the access network device. Alternatively, when the access network device requests the first REDCAP information, the access and mobility management network element may send the received first REDCAP information to the access network device.

For example, the NAS message may be a registration request message (registration request message).

For example, the access and mobility management network element may send the first REDCAP information to the access network device by using an N2 message. N2 is an interface between the access and mobility management network element and the access network device. If a name of the interface changes, a name of the message also changes accordingly.

S402. The access network device sends a first request message to the access and mobility management network element based on the first REDCAP information. Correspondingly, the access and mobility management network element receives the first request message sent by the terminal apparatus.

For example, the first request message indicates the access and mobility management network element to obtain subscribed information of the terminal apparatus from a unified data management network element. The subscribed information includes second REDCAP information. For example, the first request message may include identification information of the terminal apparatus, for example, a subscription permanent identifier (subscription permanent identifier, SUPI).

Further, the first request message may further include fourth indication information. The fourth indication information indicates the access and mobility management network element to obtain only the second REDCAP information from the unified data management network element, and not to obtain other subscribed information of the terminal apparatus.

S403. The access and mobility management network element sends a second request message to the unified data management network element based on the first request message from the access network device.

It should be understood that content of the first request message and the second request message may be the same. However, this is not limited in this application. For example, when the first request message includes the fourth indication information, the second request message may not include the fourth indication information.

S404. The unified data management network element sends the subscribed information of the terminal apparatus or the second REDCAP information to the access and mobility management network element. Correspondingly, the access and mobility management network element receives the subscribed information of the terminal apparatus or the second REDCAP information.

Specifically, the unified data management network element may search for the second REDCAP information from the subscribed information of the terminal apparatus based on a request of the access and mobility management network element, and then send the second REDCAP information to the access and mobility management network element. Alternatively, the unified data management network element sends the subscribed information of the terminal apparatus to the access and mobility management network element based on the request of the access and mobility management network element. The subscribed information of the terminal apparatus includes the second REDCAP information.

S405. The access and mobility management network element sends the second REDCAP information or the subscribed information of the terminal apparatus to the access network device. Correspondingly, the access network device receives the second REDCAP information or the subscribed information of the terminal apparatus.

S406. The access network device determines, based on the first REDCAP information and the second REDCAP information, whether to allow the terminal apparatus to use a service corresponding to the first REDCAP information.

This step is the same as S330, and reference may be made to S330.

In some embodiments, the method may further include:

S407*a*. The access network device sends first indication information to the terminal apparatus. Correspondingly, the terminal apparatus receives the first indication information. The first indication information indicates not to allow the terminal apparatus to use the service corresponding to the first REDCAP information, or the first indication information indicates that the terminal apparatus cannot use the service corresponding to the first REDCAP information.

In S406, if the access network device determines not to allow the terminal apparatus to use the service corresponding to the first REDCAP information, the access network device may send the first indication information to the terminal apparatus, and indicate, to the terminal apparatus by using the first indication information, that the terminal apparatus cannot use the service corresponding to the first REDCAP information.

For example, the first indication information may include a cause value. The cause value indicates a reason why the terminal apparatus is rejected, that is, the cause value indicates a reason why the terminal apparatus is not allowed to use the service corresponding to the first REDCAP information. For example, the cause value indicates that the terminal apparatus does not subscribe to a REDCAP access technology. For example, the cause value indicates that the terminal apparatus is not authorized/has no right to use a service of a first service type.

For example, the first indication information or the cause value may be carried in an RRC reject message or an RRC release message.

In some embodiments, the method may further include:

S408*a*. The terminal apparatus sends adjusted REDCAP information to the access network device.

After receiving the first indication information, the terminal apparatus may report the adjusted REDCAP information to the access network device, and the access network device may determine whether to allow the terminal apparatus to use a service corresponding to the adjusted REDCAP information.

For example, if the adjusted REDCAP information may indicate a REDCAP access technology and a second service type, an access technology used for the second service type is the REDCAP access technology, and the second REDCAP information indicates the REDCAP access technology and the second service type, the terminal apparatus is allowed to use the service corresponding to the adjusted REDCAP information.

In some embodiments, the method may further include:

S409*a*. The terminal apparatus initiates a mobility update process, and updates the radio capability information of the terminal apparatus, to update the first REDCAP information.

That is, the terminal apparatus sends the adjusted REDCAP information to the access network device by updating the radio capability information of the terminal apparatus.

It should be understood that either S408*a* or S409*a* may be performed.

In some embodiments, the method may further include:

S407*b*. The access network device sends second indication information to the terminal apparatus, and the second indication information indicates to allow the terminal apparatus to use the service corresponding to the first REDCAP information. Correspondingly, the terminal apparatus receives the second indication information.

In S406, if the access network device determines to allow the terminal apparatus to use the service corresponding to the first REDCAP information, the access network device may send the second indication information to the terminal apparatus.

Alternatively, in S406, if the access network device determines to allow the terminal apparatus to use the service corresponding to the first REDCAP information, and a first service type indicated by the first REDCAP information represents a high access priority, the access network device may send the second indication information to the terminal apparatus. For example, if the access network device determines to allow the terminal apparatus to use the service corresponding to the first REDCAP information, and the first service type indicated by the first REDCAP information is a wearable service, the access network device may send the second indication information to the terminal apparatus. For example, the second indication information may be carried in an RRC accept message.

It should be understood that either S407*a* or S407*b* may be performed.

According to the communication method provided in this application, the terminal apparatus may report the first REDCAP information to the access network device, and the access network device verifies the first REDCAP information after obtaining subscribed REDCAP information (that is, the second REDCAP information) of the terminal apparatus, to determine whether the terminal apparatus can use the service corresponding to the first REDCAP information. This helps ensure that the terminal apparatus can use only a service corresponding to the terminal apparatus.

Figure 5:
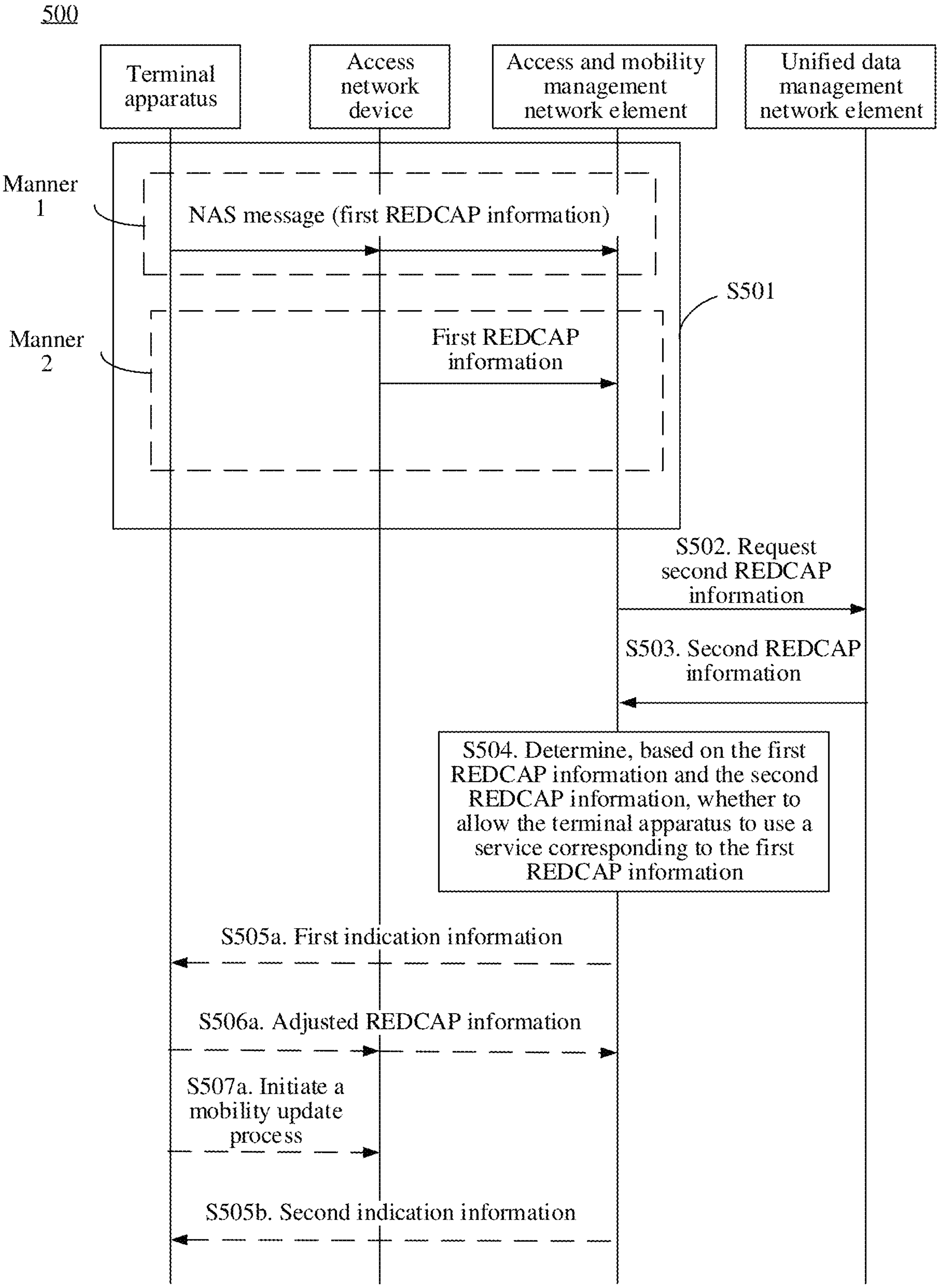
FIG. 5 is a schematic flowchart of a communication method according to this application.

FIG. 5 is a schematic flowchart of a communication method according to this application. A method 500 is an example in which a first network element is an access and mobility management network element. The following describes the method 500.

S501. An access and mobility management network element obtains first REDCAP information.

The access and mobility management network element may obtain the first REDCAP information in a plurality of manners. The following uses an example for description.

Manner 1

A terminal apparatus may send a NAS message to the access and mobility management network element, and the NAS message may carry the first REDCAP information. Therefore, the access and mobility management network element may obtain the first REDCAP information by receiving the NAS message.

For example, the NAS message may be a registration request message.

Manner 2

An access network device may send the first REDCAP information to the access and mobility management network element.

For example, the first REDCAP information on an access network device side may be sent by the terminal apparatus to the access network device by using an RRC message.

For example, the first REDCAP information on the access network device side may be determined by the access network device based on radio capability information that is of the terminal apparatus and that is sent by the terminal apparatus. For example, in a process in which the terminal apparatus is registered during startup for the first time upon, the terminal apparatus may send the radio capability information (which is possibly at a request of the access network device) of the terminal apparatus to the access network device. For how the access network device determines the first REDCAP information based on the radio capability information that is of the terminal apparatus and that is sent by the terminal apparatus, refer to Manner 2 in the method 400. Details are not described herein again.

For example, the first REDCAP information on the access network device side may be determined by the access network device based on the radio capability information that is of the terminal apparatus and that is obtained from the access and mobility management network element. Specifically, the terminal apparatus may send the radio capability information of the terminal apparatus to the access network device, and the access network device may send the radio capability information to the access and mobility management network element. After the terminal apparatus completes an RRC connection to the access network device, the access network device may request the radio capability information from the access and mobility management network element. After receiving a request of the access network device, the access and mobility management network element returns the radio capability information to the access network device. The access network device may determine the first REDCAP information based on the radio capability information, and send the first REDCAP information to the access and mobility management network element. For how the access network device determines the first REDCAP information based on the radio capability information, refer to the descriptions in Manner 2. Details are not described herein again.

S502 and S503. The access and mobility management network element sends a second request message to a unified data management network element based on the first REDCAP information, to request second REDCAP information or subscribed information of the terminal apparatus. The unified data management network element returns the second REDCAP information or the subscribed information of the terminal apparatus to the access and mobility management network element based on a request of the access and mobility management network element.

Steps S502 and S503 are the same as S403 and S404. For details, refer to descriptions of S403 and S404. Details are not described herein again.

S504. The access and mobility management network element determines, based on the first REDCAP information and the second REDCAP information, whether to allow the terminal apparatus to use a service corresponding to the first REDCAP information.

This step is the same as S330, and reference may be made to S330.

In some embodiments, the method may further include:

S505*a*. The access and mobility management network element sends first indication information to the terminal apparatus, and the first indication information indicates not to allow the terminal apparatus to use the service corresponding to the first REDCAP information. Correspondingly, the terminal apparatus receives the first indication information.

In S504, if the access and mobility management network element determines not to allow the terminal apparatus to use the service corresponding to the first REDCAP information, the access and mobility management network element may send the first indication information to the terminal apparatus.

For example, the first indication information may include a cause value, and the cause value indicates a reason why the terminal apparatus is rejected. For example, the cause value indicates that the terminal apparatus does not subscribe to a REDCAP access technology. For example, the cause value indicates that the terminal apparatus is not authorized/has no right to use a service of a first service type.

For example, the first indication information or the cause value may be carried in a NAS reject (NAS reject) message. For example, the NAS reject message may be a NAS registration reject message.

In some embodiments, the method may further include:

S506*a*. The terminal apparatus sends adjusted REDCAP information to the access and mobility management network element.

After receiving the first indication information, the terminal apparatus may report the adjusted REDCAP information to the access network device, and then the access network device sends the adjusted REDCAP information to the access and mobility management network element. The access and mobility management network element may determine whether to allow the terminal apparatus to use a service corresponding to the adjusted REDCAP information.

For example, if the adjusted REDCAP information may indicate a REDCAP access technology and a second service type, an access technology used for the second service type is the REDCAP access technology, and the second REDCAP information indicates the REDCAP access technology and the second service type, the terminal apparatus is allowed to use the service corresponding to the adjusted REDCAP information.

In some embodiments, the method may further include:

S507*a*. The terminal apparatus initiates a mobility update process, and updates a radio capability of the terminal apparatus, to update the first REDCAP information.

That is, the terminal apparatus sends the adjusted REDCAP information to the access network device by updating the radio capability information of the terminal apparatus. The access network device may send the adjusted REDCAP information to the access and mobility management network element, and the access and mobility management network element may determine whether to allow the terminal apparatus to use the service corresponding to the adjusted REDCAP information. It should be understood that either S506*a* or S507*a* may be performed.

In some embodiments, the method may further include:

S505*b*. The access and mobility management network element sends second indication information to the terminal apparatus, and the second indication information indicates to allow the terminal apparatus to use the service corresponding to the first REDCAP information. Correspondingly, the terminal apparatus receives the second indication information.

In S504, if the access and mobility management network element determines to allow the terminal apparatus to use the service corresponding to the first REDCAP information, the access and mobility management network element may send the second indication information to the terminal apparatus.

For example, the second indication information may be carried in a NAS accept message.

It should be understood that either S505*a* or S506*b* may be performed.

According to the communication method provided in this application, the access and mobility management network element may obtain the first REDCAP information, and may verify the first REDCAP information after obtaining subscribed REDCAP information (that is, the second REDCAP information) of the terminal apparatus, to determine whether the terminal apparatus can use the service corresponding to the first REDCAP information. This helps ensure that the terminal apparatus can use only a service corresponding to the terminal apparatus.

Figure 6:
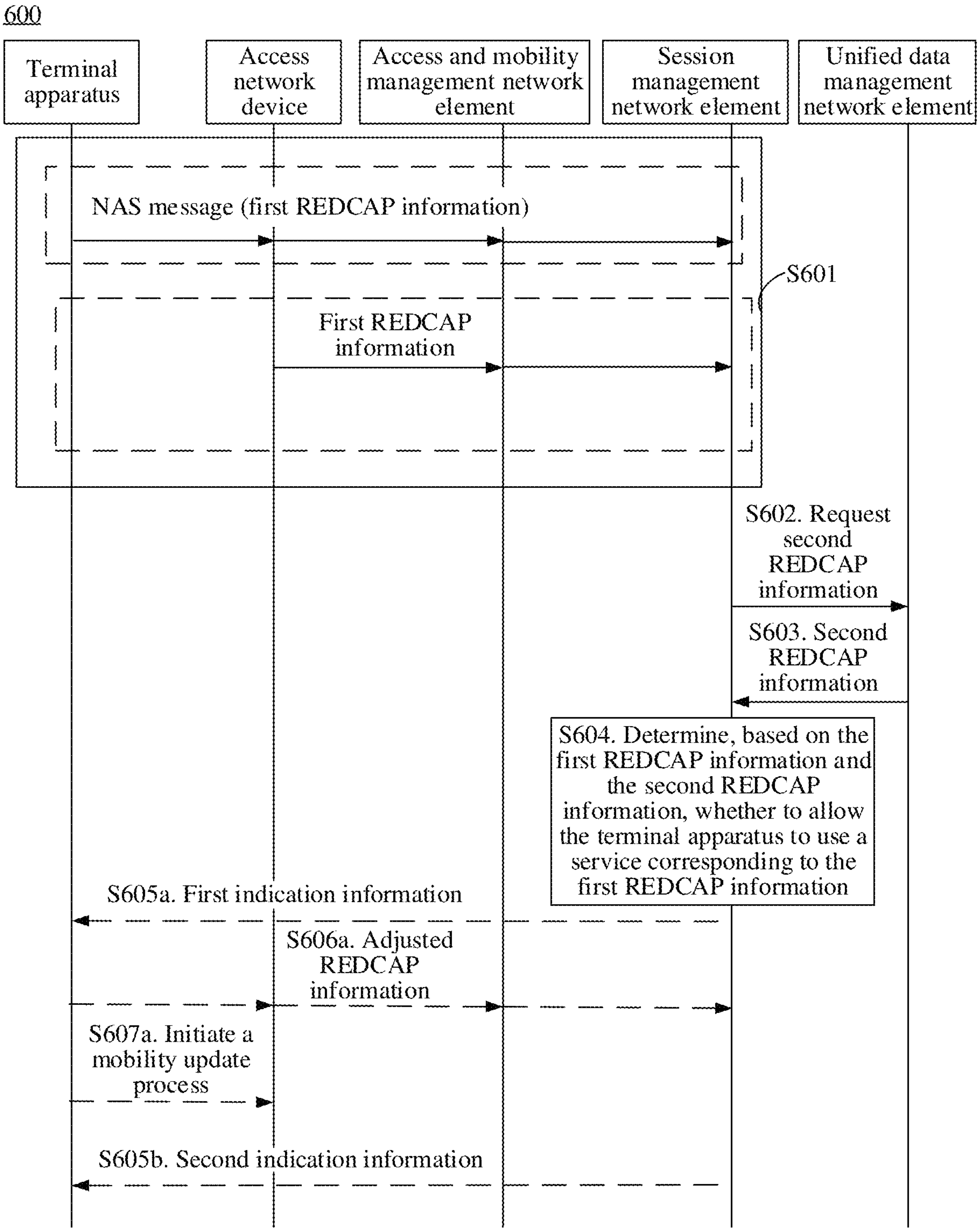
FIG. 6 is a schematic flowchart of another communication method according to this application.

FIG. 6 is a schematic flowchart of a communication method according to this application. A method 600 is an example in which a first network element is a session management network element. The following describes the method 600.

S601. A session management network element obtains first REDCAP information.

Specifically, an access and mobility management network element may send the first REDCAP information to the session management network element. For how the access and mobility management network element obtains the first REDCAP information, refer to the descriptions of S501 in the method 500. Details are not described herein again.

S602. The session management network element sends a third request message to a unified data management network element.

For example, content of the third request message may be the same as the content of the first request message or the second request message described above. For details, refer to descriptions of steps S402 and S403 in the method 400. Details are not described herein again.

S603. The unified data management network element returns second REDCAP information or subscribed information of a terminal apparatus to the session management network element based on a request of the terminal apparatus. Correspondingly, the session management network element receives the second REDCAP information or the subscribed information of the terminal apparatus. The subscribed information of the terminal apparatus includes the second REDCAP information.

S604. The session management network element determines, based on the first REDCAP information and the second REDCAP information, whether to allow the terminal apparatus to use a service corresponding to the first REDCAP information.

This step is the same as S330, and reference may be made to S330.

In some embodiments, the method may further include:

S605*a*. The session management network element sends first indication information to the terminal apparatus, and the first indication information indicates not to allow the terminal apparatus to use the service corresponding to the first REDCAP information. Correspondingly, the terminal apparatus receives the first indication information.

In S604, if the session management network element determines not to allow the terminal apparatus to use the service corresponding to the first REDCAP information, the session management network element may send the first indication information to the access and mobility management network element. For example, the access and mobility management network element may include the first indication information in a NAS message sent to the terminal apparatus.

For example, the first indication information may include a cause value, and the cause value indicates a reason why the terminal apparatus is rejected. For example, the cause value indicates that the terminal apparatus does not subscribe to a REDCAP access technology. For example, the cause value indicates that the terminal apparatus is not authorized/has no right to use a service of a first service type. For example, the first indication information or the cause value may be carried in a NAS SM reject message. For example, the NAS reject message may be a PDU session establishment reject message.

In some embodiments, the method may further include:

S606*a*. The terminal apparatus sends adjusted REDCAP information to an access network device, and the access network device sends the adjusted REDCAP information to the session management network element by using the access and mobility management network element.

After receiving the first indication information, the terminal apparatus may report the adjusted REDCAP information to the access network device, and the access network device sends the adjusted REDCAP information to the session management network element by using the access and mobility management network element. The session management network element may determine whether to allow the terminal apparatus to use a service corresponding to the adjusted REDCAP information. For example, if the adjusted REDCAP information may indicate a REDCAP access technology and a second service type, an access technology used for the second service type is the REDCAP access technology, and the second REDCAP information indicates the REDCAP access technology and the second service type, the terminal apparatus is allowed to use the service corresponding to the adjusted REDCAP information.

In some embodiments, the method may further include:

S607*a*. The terminal apparatus initiates a mobility update process, and updates a radio capability of the terminal apparatus, to update the first REDCAP information.

That is, the terminal apparatus sends the adjusted REDCAP information to the access network device by updating the radio capability information of the terminal apparatus. The access network device may send the adjusted REDCAP information to the session management network element by using the access and mobility management network element, and the session management network element may determine whether to allow the terminal apparatus to use the service corresponding to the adjusted REDCAP information.

It should be understood that either S606*a* or S607*a* may be performed.

In some embodiments, the method may further include:

S605*b*. The session management network element sends second indication information to the terminal apparatus, and the second indication information indicates to allow the terminal apparatus to use the service corresponding to the first REDCAP information. Correspondingly, the terminal apparatus receives the second indication information.

In S604, if the session management network element determines to allow the terminal apparatus to use the service corresponding to the first REDCAP information, the session management network element may send the second indication information to the terminal apparatus.

For example, the second indication information may be carried in a PDU session establishment accept message.

It should be understood that either S605*a* or S606*b* may be performed.

According to the communication method provided in this application, the session management network element may obtain the first REDCAP information, and may verify the first REDCAP information after obtaining subscribed REDCAP information (that is, the second REDCAP information) of the terminal apparatus, to determine whether the terminal apparatus can use the service corresponding to the first REDCAP information. This helps ensure that the terminal apparatus can use only a service corresponding to the terminal apparatus.

Figure 7:
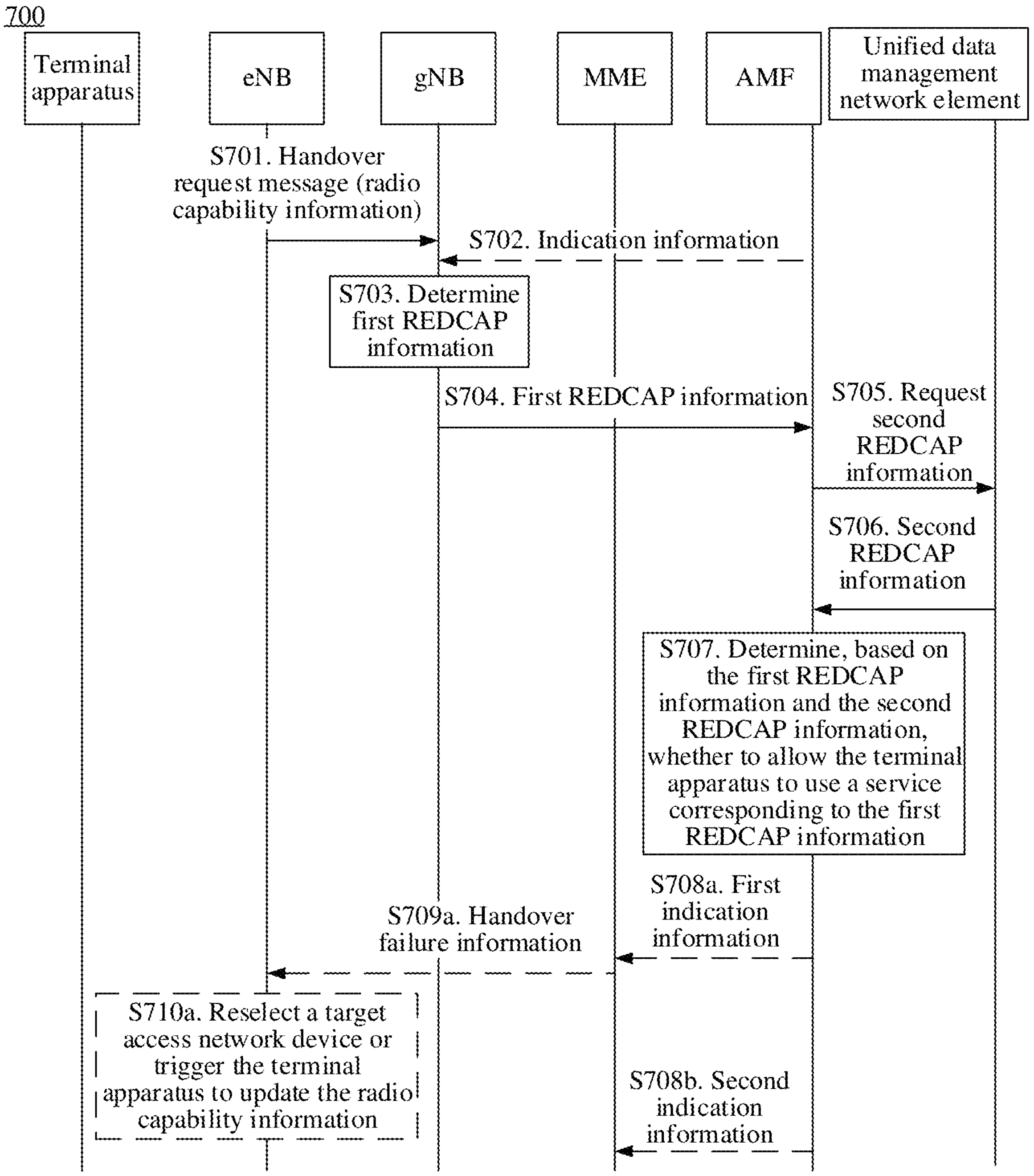
FIG. 7 is a schematic flowchart of a communication method according to this application.

FIG. 7 is a schematic flowchart of a communication method according to this application. A method 700 is an example in which a first network element is an access and mobility management network element in a second network in a process in which a terminal apparatus is handed over from a first network to the second network. For example, the first network may be a 4G network or an LTE network, and the second network may be a 5G network or an NR network. However, this is not limited in this application.

For ease of understanding and description, an access network device in the second network is denoted as a target access network device, and an access network device in the first network is denoted as a source access network device. An access and mobility management network element in the second network is denoted as a target access and mobility management network element, and access and mobility management network element in the first network is denoted as a source access and mobility management network element. For example, the target access network device may be a gNB shown in the figure, and the source access network device may be an eNB shown in the figure. The target access and mobility management network element may be an AMF shown in the figure, and the source access and mobility management network element may be an MME shown in the figure. The following describes the method 700.

S701. The source access network device sends a handover request message to the target access network device. Correspondingly, the target access network device receives the handover request message from the source access network device. The handover request message includes radio capability information of the terminal apparatus.

For how the source access network device obtains the radio capability information of the terminal apparatus, refer to the descriptions of obtaining the radio capability information of the terminal apparatus by the access network device in step S401. However, it should be understood that, in this case, an access and mobility management network element is the access and mobility management network element in the first network, for example, the MME.

It should be understood that, in an inter-RAT handover scenario, for a procedure that needs to be performed before step S701, refer to the technology of some approaches, for example, refer to TS 23.502 Clause 4.111.2.2. Details are not described herein.

S702. When the target access and mobility management network element determines that the terminal apparatus is performing an inter-RAT handover, for example, determines that the terminal is being handed over from an LTE system to a 5G system, the target access and mobility management network element may send REDCAP indication information to the target access network device. Correspondingly, the target access network device receives the REDCAP indication information.

The REDCAP indication information indicates the target access network device to determine first REDCAP information based on the radio capability information of the terminal apparatus.

It should be understood that 702 may be performed before S701, or may be performed after S701. This is not limited in this embodiment of this application.

S703. The target access network device determines the first REDCAP information based on the radio capability information of the terminal apparatus.

In some embodiments, the target access network device may determine the first REDCAP information from the radio capability information of the terminal based on the REDCAP indication information sent by the access and mobility management network element.

For how the target access network device determines the first REDCAP information based on the radio capability information of the terminal apparatus, refer to the related descriptions of determining the first REDCAP information by the access network device based on the radio capability information of the terminal apparatus in Manner 2 of step S401. Details are not described herein again.

In this embodiment of this application, S702 is an optional step. To be specific, the target access network device may determine the first REDCAP information based on the REDCAP indication information sent by the target access and mobility management network element, or may independently determine the first REDCAP information.

S704. After determining the first REDCAP information, the target access network device sends the first REDCAP information to the target access and mobility management network element. Correspondingly, the target access and mobility management network element receives the first REDCAP information.

S705 and S706. The target access and mobility management network element sends a second request message to a unified data management network element, and the unified data management network element returns second REDCAP information or subscribed information of the terminal apparatus to the target access and mobility management network element based on a request of the target access and mobility management network element.

For example, content of the second request message herein may be the same as the content of the second request message described above. For details, refer to the descriptions of steps S402 and S403 in the method 400. Details are not described herein again.

S707. The target access and mobility management network element determines, based on the first REDCAP information and the second REDCAP information, whether to allow the terminal apparatus to use a service corresponding to the first REDCAP information.

This step is the same as S330, and reference may be made to S330.

In some embodiments, the method may further include:

S708*a*. The target access and mobility management network element sends first indication information to the source access and mobility management network element, and the first indication information indicates not to allow the terminal apparatus to use the service corresponding to the first REDCAP information. Correspondingly, the source access and mobility management network element receives the first indication information.

In S707, if the target access and mobility management network element determines not to allow the terminal apparatus to use the service corresponding to the first REDCAP information, the target access and mobility management network element may send the first indication information to the terminal apparatus.

For example, the first indication information may include a cause value, and the cause value indicates a reason why the terminal apparatus is rejected. For example, the cause value indicates that the terminal apparatus does not subscribe to a REDCAP access technology. For example, the cause value indicates that the terminal apparatus is not authorized/has no right to use a service of a first service type. In some embodiments, the method may further include one or more of the following steps:

S709*a*. The source access and mobility management network element sends handover failure information to the source access network device. Correspondingly, the source access network device receives the handover failure information. The handover failure information indicates a handover failure.

S710*a*. Based on the handover failure information, the source access network device reselects the target access network device or triggers the terminal apparatus to update the radio capability information.

In some embodiments, the method may further include:

S708*b*. The target access and mobility management network element sends second indication information to the source access and mobility management network element, and the second indication information indicates to allow the terminal apparatus to use the service corresponding to the first REDCAP information. Correspondingly, the source access and mobility management network element receives the second indication information.

In S707, if the target access and mobility management network element determines to allow the terminal apparatus to use the service corresponding to the first REDCAP information, the target access and mobility management network element may send the second indication information to the source access and mobility management network element.

It should be understood that either S708*a* or 708*b* may be performed.

Figure 8:
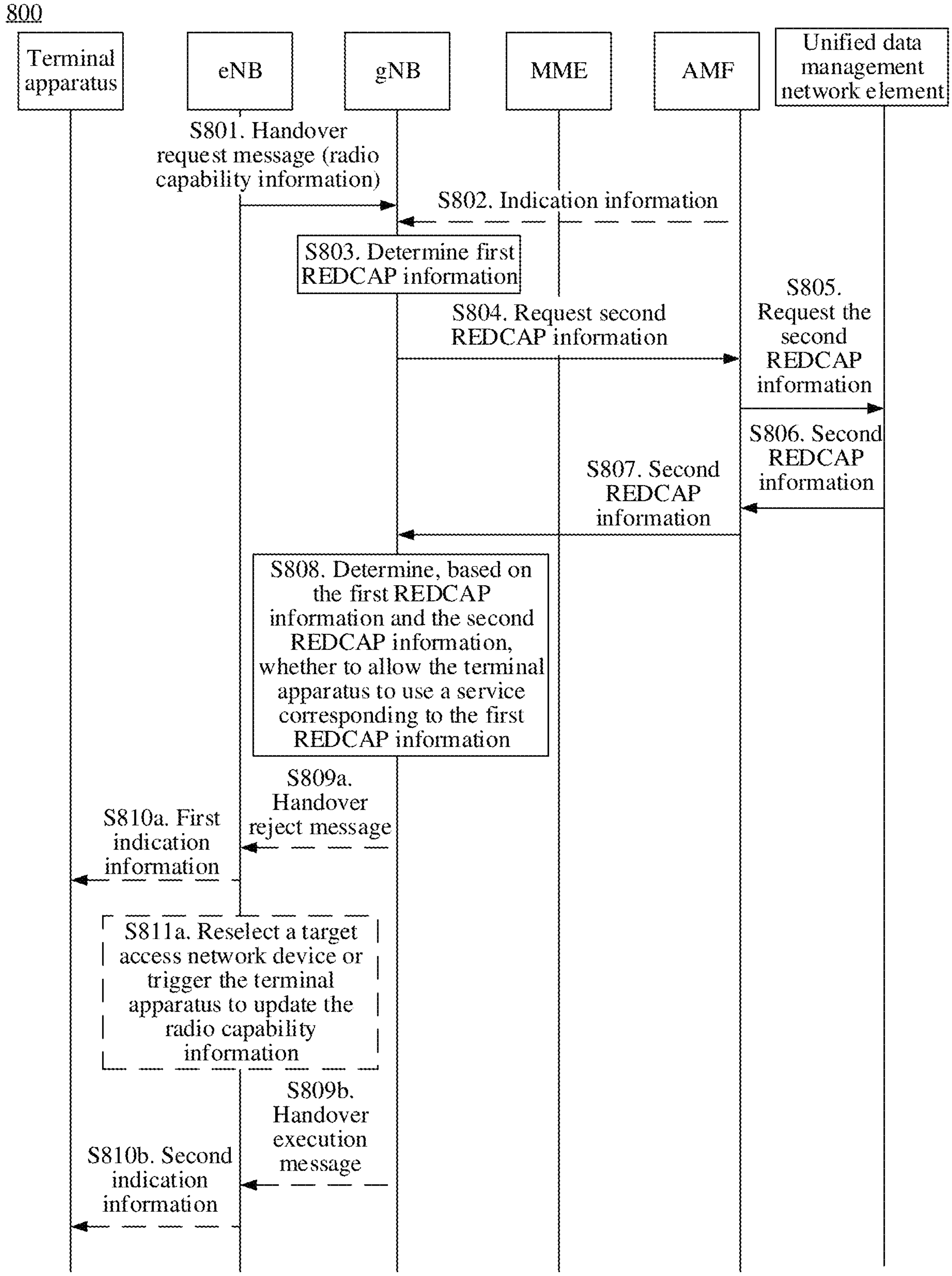
FIG. 8 is a schematic flowchart of another communication method according to this application.

According to the communication method provided in this application, in an inter-RAT handover process, the target access and mobility management network element may obtain the first REDCAP information, and may verify the first REDCAP information after obtaining subscribed REDCAP information (that is, the second REDCAP information) of the terminal apparatus, to determine whether the terminal apparatus can use the service corresponding to the first REDCAP information. This helps ensure that the terminal apparatus can use only a service corresponding to the terminal apparatus. FIG. 8 is a schematic flowchart of a communication method according to this application. A method 800 is an example in which a first network element is a target access network device in a second network in a process in which a terminal apparatus is handed over from a first network to the second network. The first network may be a 4G network or an LTE network, and the second network may be a 5G network or an NR network. However, this is not limited in this application.

For ease of understanding and description, an access network device in the second network is denoted as a target access network device, and an access network device in the first network is denoted as a source access network device. An access and mobility management network element in the second network is denoted as a target access and mobility management network element, and the access network device in the first network is denoted as a source access and mobility management network element. For example, the target access network device may be a gNB shown in the figure, and the source access network device may be an eNB shown in the figure. The target access and mobility management network element may be an AMF shown in the figure, and the source access and mobility management network element may be an MME shown in the figure.

S801 to S803 are the same as S801 to S803, and reference may be made to S801 to S803.

S804. The target access network device sends a first request message to the target access and mobility management network element.

For example, content of the first request message herein may be the same as the content of the first request message described above. For details, refer to descriptions of steps S402 and S403 in the method 400. Details are not described herein again.

S805 and S806. The target access and mobility management network element sends a second request message to a unified data management network element, to request second REDCAP information or subscribed information of the terminal apparatus. The unified data management network element returns the second REDCAP information or the subscribed information of the terminal apparatus to the target access and mobility management network element based on a request of the target access and mobility management network element.

It should be understood that content of the first request message and the second request message may be the same. However, this is not limited in this application. For example, when the first request message includes fourth indication information, the second request message may not include the fourth indication information.

It should be noted that S804 is an optional step. In one manner, after determining that the terminal apparatus is performing an inter-RAT handover, the target access and mobility management network element may request the second REDCAP information or the subscribed information of the terminal apparatus from the unified data management network element. In another manner, after receiving the first request message sent by the target access network device, the target access and mobility management network element requests the second REDCAP information or the subscribed information of the terminal apparatus from the unified data management network element.

S807. The target access and mobility management network element sends the second REDCAP information or the subscribed information of the terminal apparatus to the target access network device. Correspondingly, the target access network device receives the second REDCAP information or the subscribed information of the terminal apparatus. The subscribed information of the terminal apparatus includes the second REDCAP information.

S808. The target access network device determines, based on the first REDCAP information and the second REDCAP information, whether to allow the terminal apparatus to use a service corresponding to the first REDCAP information.

This step is the same as S330, and reference may be made to S330.

It should be understood that S805 to S808 are similar to S403 to S406, and reference may be made to S403 to S406.

In some embodiments, the method may further include:

S809*a*. The target access network device sends a handover reject message to the source access network device.

In S808, if the target access network device determines not to allow the terminal apparatus to perform network communication with the target access network device, the target access network device may send the handover reject message to the source access network device.

In some embodiments, the method may further include:

S810*a*. The source access network device sends first indication information to the terminal apparatus, and the first indication information indicates not to allow the terminal apparatus to use the service corresponding to the first REDCAP information. Correspondingly, the terminal apparatus receives the first indication information.

After receiving the handover reject message, the source access network device may send the first indication information to the terminal apparatus, and indicate, to the terminal apparatus by using the first indication information, that the terminal apparatus is not allowed to use the service corresponding to the first REDCAP information.

For example, the first indication information may include a cause value, and the cause value indicates a reason why the terminal apparatus is rejected. For example, the cause value indicates that the second REDCAP information indicates that the terminal apparatus does not subscribe to a REDCAP access technology. For example, the cause value indicates that the terminal apparatus is not authorized/has no right to use a service of a first service type. S811*a*. Based on the handover reject message, the source access network device reselects the target access network device or triggers the terminal apparatus to update radio capability information.

It should be understood that either S810*a* or S811*a* may be performed.

In some embodiments, the method may further include:

S809*b*. The target access network device sends a handover execution message to the source access network device.

In S808, if the target access network device determines to allow the terminal apparatus to perform network communication with the target access network device, the target access network device may send the handover execution message to the source access network device.

S810*b*. The source access network device sends second indication information to the terminal apparatus. The second indication information indicates to allow the terminal apparatus to use the service corresponding to the first REDCAP information. Correspondingly, the terminal apparatus receives the second indication information.

After receiving the handover execution message, the source access network device may learn that the target access network device allows the terminal apparatus to use the service corresponding to the first REDCAP information, and may send the second indication information to the terminal apparatus.

According to the communication method provided in this application, in an inter-RAT handover process, the target access network device may obtain the first REDCAP information, and may verify the first REDCAP information after obtaining subscribed REDCAP information (that is, the second REDCAP information) of the terminal apparatus, to determine whether the terminal apparatus can use the service corresponding to the first REDCAP information. This helps ensure that the terminal apparatus can use only a service corresponding to the terminal apparatus. In some embodiments, the second REDCAP information further indicates service feature information corresponding to the at least one service type. For example, when indicating the REDCAP access technology and the at least one service type, the second REDCAP information may further indicate the service feature information corresponding to the at least one service type. For example, the service feature information may be mobility information and/or an energy saving requirement.

In the method 400, in a scenario in which the access network device determines to allow the terminal apparatus to use the service corresponding to the first REDCAP information, the access network device may further obtain, based on the second REDCAP information, service feature information corresponding to the first service type.

In the method 500, in a scenario in which the access and mobility management network element determines to allow the terminal apparatus to use the service corresponding to the first REDCAP information, the access and mobility management network element may further obtain, based on the second REDCAP information, the service feature information corresponding to the first service type, and may send, to the access network device, the service feature information corresponding to the first service type.

In the method 600, in a scenario in which the session management network element determines to allow the terminal apparatus to use the service corresponding to the first REDCAP information, the session management network element may further obtain, based on the second REDCAP information, the service feature information corresponding to the first service type, and may send, to the access network device, the service feature information corresponding to the first service type.

In some embodiments, in an embodiment of this application, after the access network device obtains the service feature information corresponding to the first service type or after the access network device learns of a service type of the terminal apparatus, the access network device may send third indication information to the terminal apparatus. The third indication information indicates one or more of the following:

- indicates the terminal apparatus to store a timing advance TA value used in a current RRC connection setup process, and use the TA value during a next RRC connection setup;
- indicates the terminal apparatus to reduce a frequency of neighboring cell measurement; or
- indicates the terminal apparatus to store transmit power used in a current RRC connection setup process, and use the transmit power during a next RRC connection setup.

For example, when the service feature information corresponding to the first service type is a fixed location of the terminal apparatus or when the terminal apparatus is used in a video surveillance scenario, the access network device may send the third indication information.

In some embodiments, in an embodiment of this application, after the access network device obtains the service feature information corresponding to the first service type or the service type, the access network device may send broadcast information. The broadcast information includes REDCAP access technology indication information and optimization indication information. The optimization information indication indicates whether a terminal apparatus whose access technology is a first radio access technology enables an optimization function based on the optimization indication information. The optimization function includes one or more of the following:

storing a timing advance TA value used in a current RRC connection setup process, and using the TA value during a next RRC connection setup;

reducing a frequency of neighboring cell measurement; or storing transmit power used in a current RRC connection setup process, and using the transmit power during a next RRC connection setup.

For example, when the service feature information corresponding to the first service type is a fixed location of the terminal apparatus or when the terminal apparatus is used in a video surveillance scenario, the access network device may send the broadcast information.

It should be understood that explanations or descriptions of terms in embodiments of this application may be mutually referenced or explained in embodiments. This is not limited.

It should be further understood that sequence numbers of the foregoing processes do not mean execution sequences in embodiments of this application. The execution sequences of the processes should be determined based on functions and internal logic of the processes. Numbers or sequence numbers in the foregoing processes are merely for differentiation for ease of description, and should not constitute any limitation on an implementation process of embodiments of this application.

In addition, the methods described above mainly relate to a REDCAP technology. However, it should be understood that the methods may also be extended to another technology, for example, the methods may be extended to a 6G or 6.5G technology.

The foregoing describes the methods provided in this application with reference to FIG. 3 to FIG. 8, and the following describes an apparatus provided in this application.

Figure 9:
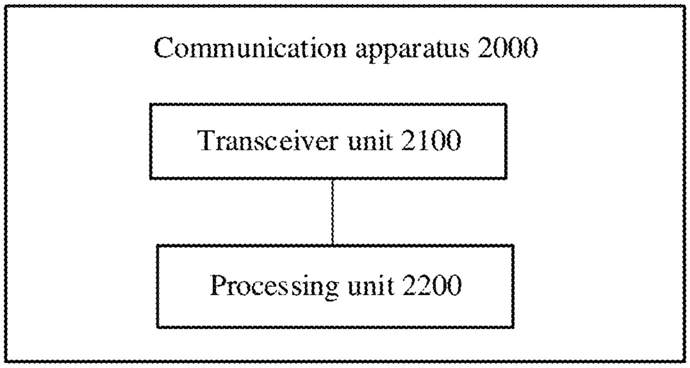
FIG. 9 is a schematic block diagram of a communication apparatus according to this application.

FIG. 9 is a schematic block diagram of a communication apparatus according to this application. As shown in FIG. 9, a communication apparatus 2000 may include a transceiver unit 2100 and a processing unit 2200.

The transceiver unit 2100 may include a sending unit and/or a receiving unit. The transceiver unit 2100 may be a transceiver (including a transmitter and/or a receiver), an input/output interface (including an input interface and/or an output interface), a pin, a circuit, or the like. The transceiver unit 2100 may be configured to perform the sending and/or receiving steps in the foregoing method embodiments. The processing unit 2200 may be a processor (which may include one or more processors), a processing circuit having a processor function, or the like, and may be configured to perform another step other than the sending and receiving steps in the foregoing method embodiments.

In some embodiments, the communication apparatus may further include a storage unit. The storage unit may be a memory, an internal storage unit (for example, a register or a cache), an external storage unit (for example, a read-only memory or a random-access memory), or the like. The storage unit is configured to store instructions, and the processing unit 2200 executes the instructions stored in the storage unit, to enable the communication apparatus to perform the foregoing methods.

In a design, the communication apparatus 2000 may correspond to the first network element in the foregoing method embodiments, for example, the first network element in the method 300, the access network device in the method 400, the access and mobility management network element in the method 500, the session management network element in the method 600, the target access and mobility management network element in the method 700, or the target access network device in the method 800, and may perform an operation performed by the first network element.

Specifically, the transceiver unit 2100 is configured to obtain first REDCAP information from a terminal apparatus and subscribed second REDCAP information of the terminal apparatus. The processing unit 2200 is configured to determine, based on the first REDCAP information and the second REDCAP information, whether to allow the terminal apparatus to use a service corresponding to the first REDCAP information.

In some embodiments, the first REDCAP information indicates a REDCAP access technology, and the second REDCAP information indicates whether the terminal apparatus subscribes to the REDCAP access technology.

In some embodiments, the first REDCAP information indicates the REDCAP access technology and a first service type, an access technology used for the first service type is the REDCAP access technology, the second REDCAP information indicates the REDCAP access technology and at least one service type, and an access technology used for the at least one service type is the REDCAP access technology.

In some embodiments, the first REDCAP information indicates a first-type REDCAP access technology, the second REDCAP information indicates at least one type of REDCAP access technology, and different types of REDCAP access technologies correspond to different service types.

In some embodiments, the transceiver unit 2100 is further configured to send first indication information to the terminal apparatus. The first indication information indicates that the terminal apparatus cannot use the service corresponding to the first REDCAP information.

In some embodiments, the first indication information includes a cause value, and the cause value indicates a reason why the terminal apparatus is rejected.

In some embodiments, the apparatus 2000 is an access network device.

In some embodiments, the transceiver unit 2100 is specifically configured to receive a radio resource control RRC message from the terminal apparatus, and the RRC message includes the first REDCAP information.

In some embodiments, the transceiver unit 2100 is specifically configured to receive radio capability information from the terminal apparatus; and the processing unit 2200 is specifically configured to determine the first REDCAP information based on the radio capability information.

In some embodiments, the transceiver unit 2100 is specifically configured to receive a first message from an access and mobility management network element, and the first message includes the first REDCAP information.

In some embodiments, the transceiver unit 2100 is specifically configured to receive radio capability information that is of the terminal apparatus and that is from the access and mobility management network element; and the processing unit 2200 is specifically configured to determine the first REDCAP information based on the radio capability information.

In some embodiments, the apparatus 2000 is an access network device in a second network in a process in which the terminal apparatus is handed over from a first network to the second network.

In some embodiments, the transceiver unit 2100 is specifically configured to receive radio capability information that is of the terminal apparatus and that is from an access network device in the first network; and the processing unit 2200 is specifically configured to determine the first REDCAP information based on the radio capability information.

In some embodiments, the transceiver unit 2100 is further configured to receive REDCAP indication information sent by an access and mobility management network element in the second network, and the REDCAP indication information indicates the apparatus 2000 to determine the first REDCAP information based on the radio capability information.

In some embodiments, the transceiver unit is further configured to: send request information to the access and mobility management network element based on the first REDCAP information, where the request information is used for requesting the access and mobility management network element to obtain the second REDCAP information from a unified data management network element; and receive the second REDCAP information from the access and mobility management network element.

In some embodiments, the apparatus 2000 is the access and mobility management network element.

In some embodiments, the transceiver unit 2100 is specifically configured to: receive a NAS message from the terminal apparatus, where the NAS message includes the first REDCAP information; or receive the first REDCAP information from the access network device.

In some embodiments, the transceiver unit 2100 is further configured to send the radio capability information of the terminal apparatus to the access network device, and the radio capability information is used for the access network device to determine the first REDCAP information.

In some embodiments, the apparatus 2000 is an access and mobility management network element in the second network in the process in which the terminal apparatus is handed over from the first network to the second network.

In some embodiments, the transceiver unit 2100 is specifically configured to receive the first REDCAP information from the access network device in the second network, and the first REDCAP information is determined by the access network device in the second network based on radio capability information that is of the terminal apparatus and that is from the access network device in the first network.

In some embodiments, the transceiver unit 2100 is further configured to send REDCAP indication information to the access network device in the second network, and the REDCAP indication information indicates the access network device in the second network to determine the first REDCAP information based on the radio capability information.

In some embodiments, the apparatus 2000 is a session management network element.

In some embodiments, the transceiver unit 2100 is specifically configured to receive the first REDCAP information from the access and mobility management network element.

In some embodiments, the transceiver unit 2100 is specifically configured to: send the request information to the unified data management network element based on the first REDCAP information, where the request information is used for requesting the second REDCAP information; and receive the second REDCAP information from the unified data management network element.

In some embodiments, the second REDCAP information further indicates service feature information corresponding to the at least one service type.

In some embodiments, the transceiver unit 2100 is further configured to send third indication information to the terminal apparatus. The third indication information indicates one or more of the following: indicates the terminal apparatus to store a timing advance TA value used in a current RRC connection setup process, and use the TA value during a next RRC connection setup; indicates the terminal apparatus to reduce a frequency of neighboring cell measurement; or indicates the terminal apparatus to store transmit power used in a current RRC connection setup process, and use the transmit power during a next RRC connection setup.

In some embodiments, the transceiver unit 2100 is further configured to send broadcast information. The broadcast information includes REDCAP access technology indication information and optimization indication information, and the optimization information indication indicates whether a terminal apparatus whose access technology is the REDCAP access technology enables an optimization function based on the optimization indication information. The optimization function includes one or more of the following: storing the timing advance TA value used in the current RRC connection setup process, and using the TA value during the next RRC connection setup; reducing the frequency of neighboring cell measurement; or storing the transmit power used in the current RRC connection setup process, and using the transmit power during the next RRC connection setup.

It should be understood that the transceiver unit 2100 and the processing unit 2200 may further perform other operations performed by the corresponding first network element in the foregoing corresponding method. Details are not described herein again.

In another design, the communication apparatus 2000 may correspond to the terminal apparatus in the foregoing method embodiments, and may perform an operation performed by the terminal apparatus.

Specifically, the transceiver unit 2100 is configured to: send the first REDCAP information; and receive indication information from the first network element, where the indication information indicates whether to allow the apparatus 2000 to use the service corresponding to the first REDCAP information. In some embodiments, the transceiver unit 2100 is further configured to send adjusted REDCAP information based on the indication information, and the adjusted REDCAP information is different from the first REDCAP information.

In some embodiments, the first network element is the access network device.

In some embodiments, the transceiver unit 2100 is further configured to receive third indication information from the first network element. The third indication information indicates one or more of the following: indicates the apparatus 2000 to store the timing advance TA value used in the current RRC connection setup process, and use the TA value during the next RRC connection setup; indicates the apparatus 2000 to reduce the frequency of neighboring cell measurement; or indicates the apparatus 2000 to store the transmit power used in the current RRC connection setup process, and use the transmit power during the next RRC connection setup.

In some embodiments, the transceiver unit 2100 is further configured to receive broadcast information from the first network element. The broadcast information includes the REDCAP access technology indication information and the optimization indication information, and the optimization information indication indicates whether an apparatus 2000 whose access technology is the REDCAP access technology enables the optimization function based on the optimization indication information. The optimization function includes one or more of the following: storing the timing advance TA value used in the current RRC connection setup process, and using the TA value during the next RRC connection setup;

reducing the frequency of neighboring cell measurement; or storing the transmit power used in the current RRC connection setup process, and using the transmit power during the next RRC connection setup.

It should be understood that the transceiver unit 2100 and the processing unit 2200 may further perform other operations performed by the terminal apparatus in the foregoing method embodiments. Details are not described herein again.

In still another design, the communication apparatus 2000 may correspond to the unified data management network element in the foregoing method embodiments, and may perform an operation performed by the unified data management network element.

It should be understood that division of the foregoing units is merely function division, and there may be another division method during actual implementation.

It should be further understood that the processing unit may be implemented by using hardware, may be implemented by using software, or may be implemented by using a combination of software and hardware.

Figure 10:
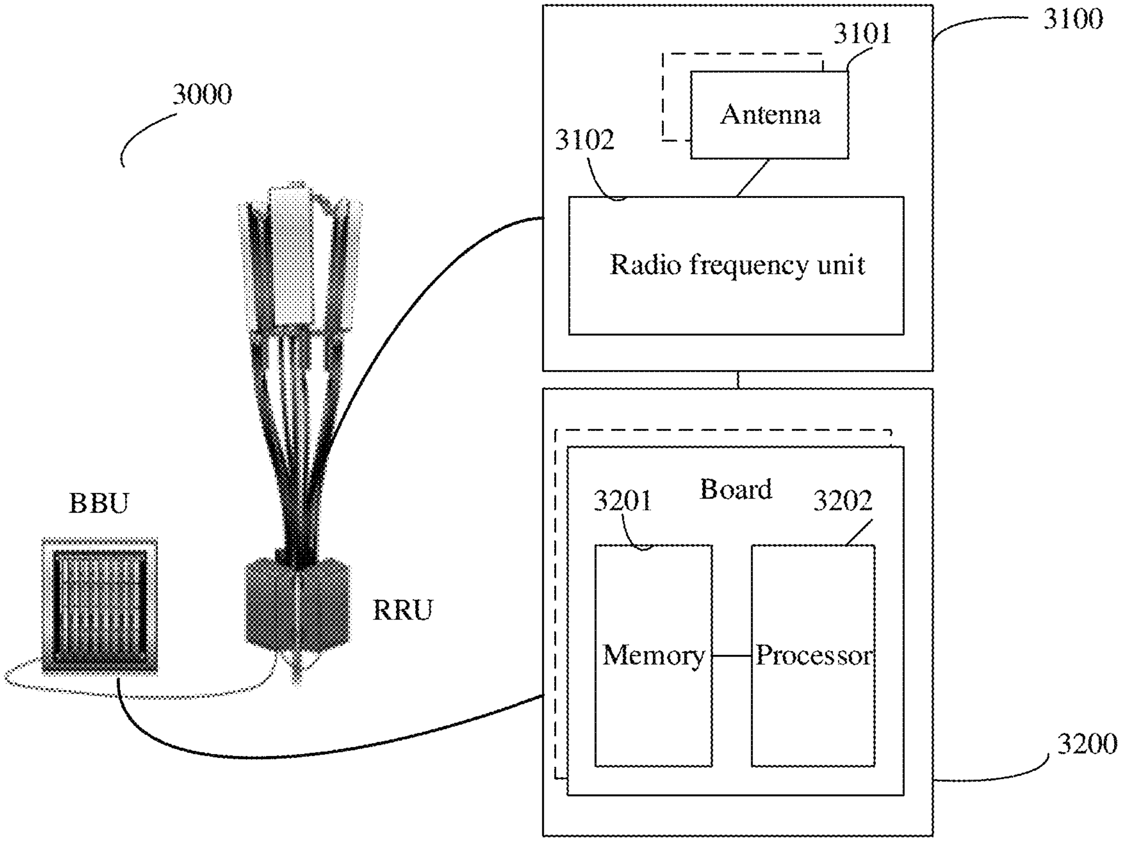
FIG. 10 is a schematic block diagram of an access network device according to this application.

It should be further understood that when the communication apparatus 2000 is the access network device, the transceiver unit 2100 in the communication apparatus may correspond to an RRU 3100 in an access network device 2000 shown in FIG. 10, and the processing unit 2200 in the communication apparatus may correspond to a BBU 3200 in the access network device 2000 shown in FIG. 10. When the communication apparatus 2000 is a chip configured in the access network device, the transceiver unit 2100 in the communication apparatus may be an input/output interface.

Figure 11:
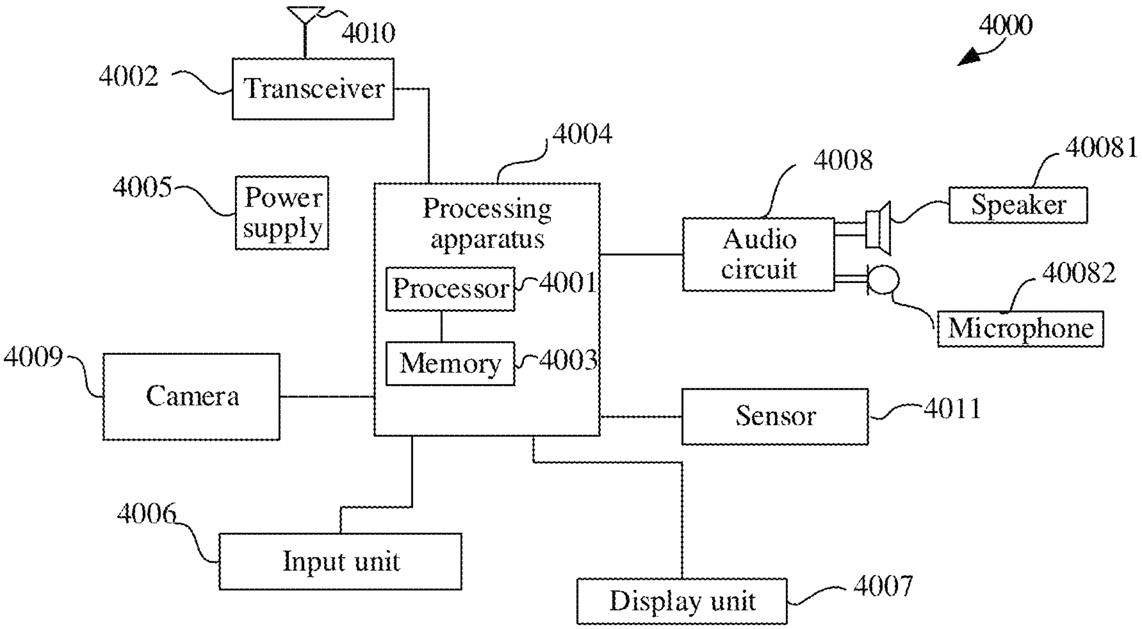
FIG. 11 is a schematic block diagram of a terminal apparatus according to this application.

It should be further understood that when the communication apparatus 2000 is the terminal apparatus, the transceiver unit 2100 in the communication apparatus 2000 may correspond to a transceiver 4002 in a terminal apparatus 4000 shown in FIG. 11, and the processing unit 2200 in the communication apparatus 2000 may correspond to a processor 4001 in the terminal apparatus 4000 shown in FIG. 11.

FIG. 10 is a schematic diagram of a structure of an access network device according to an embodiment of this application, for example, may be a schematic diagram of a structure of a base station. An access network device 3000 may implement a function of the access network device in the foregoing method embodiments.

As shown in the figure, the access network device 3000 may include one or more radio frequency units, for example, a remote radio unit (remote radio unit, RRU) 3100 and one or more baseband units (BBUs) (which may also be referred to as distributed units (Dus)) 3200. The RRU 3100 may be referred to as a transceiver unit or a communication unit, and corresponds to the transceiver unit 2100 in FIG. 9.

In some embodiments, the transceiver unit 3100 may also be referred to as a transceiver, a transceiver circuit, or the like, and may include at least one antenna 3101 and a radio frequency unit 3102. In some embodiments, the transceiver unit 3100 may include a receiving unit and a sending unit. The receiving unit may correspond to a receiver (or referred to as a receiver circuit), and the sending unit may correspond to a transmitter (or referred to as a transmitter circuit). The RRU 3100 is mainly configured to: receive and send a radio frequency signal and perform conversion between the radio frequency signal and a baseband signal. The BBU 3200 is mainly configured to: perform baseband processing, control the base station, and so on. The RRU 3100 and the BBU 3200 may be physically disposed together, or may be physically disposed separately, that is, the base station is a distributed base station.

The BBU 3200 is a control center of the base station, may also be referred to as a processing unit. The BBU 3200 may correspond to the processing unit 2200 in FIG. 9, and is mainly configured to implement a baseband processing function, for example, channel coding, multiplexing, modulation, or spreading. For example, the BBU (the processing unit) may be configured to control the base station to perform operation procedures related to the access network device in the foregoing method embodiments.

In an example, the BBU 3200 may include one or more boards, and a plurality of boards may jointly support a radio access network (for example, an LTE network) having a single access standard, or may separately support radio access networks (for example, the LTE network, a 5G network, or another network) having different access standards. The BBU 3200 further includes a memory 3201 and a processor 3202. The memory 3201 is configured to store necessary instructions and data. The processor 3202 is configured to control the base station to perform a necessary action, for example, is configured to control the base station to perform the operation procedures related to the access network device in the foregoing method embodiments. The memory 3201 and the processor 3202 may serve one or more boards. That is, a memory and a processor may be disposed on each board. Alternatively, the plurality of boards may share a same memory and a same processor. In addition, a necessary circuit may be further disposed on each board.

It should be understood that the access network device 3000 shown in FIG. 10 can implement processes related to the access network device in the foregoing method embodiments. Operations or functions of modules in the access network device 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the access network device and that is described in the foregoing method embodiments, and the RRU 3100 may be configured to perform sending and receiving actions of the access network device that are described in the foregoing method embodiments. For details, refer to the descriptions in the foregoing method embodiments. Details are not described herein again.

FIG. 11 is a schematic diagram of a structure of a terminal 4000 according to an embodiment of this application. As shown in the figure, the terminal 4000 includes a processor 4001 and a transceiver 4002. In some embodiments, the terminal 4000 may further include a memory 4003. The processor 4001, the transceiver 4002, and the memory 4003 may communicate with each other through an internal connection path, and transfer a control signal and/or a data signal. The memory 4003 is configured to store a computer program. The processor 4001 is configured to: invoke the computer program from the memory 4003 and run the computer program, to control the transceiver 4002 to receive and send a signal.

The processor 4001 and the memory 4003 may be integrated into one processing apparatus 4004. The processor 4001 is configured to execute program code stored in the memory 4003, to implement the foregoing functions. It should be understood that the processing apparatus 4004 shown in the figure is merely an example. During specific implementation, the memory 4003 may alternatively be integrated into the processor 4001, or may be independent of the processor 4001. This is not limited in this application.

The terminal 4000 may further include an antenna 4010, configured to send, by using a radio signal, uplink data or uplink control signaling output by the transceiver 4002.

It should be understood that the terminal 4000 shown in FIG. 11 can implement functions that can be implemented by the terminal apparatus in the foregoing method embodiments. Operations or functions of modules in the terminal 4000 are separately intended to implement corresponding procedures in the foregoing method embodiments. For details, refer to the descriptions in the foregoing method embodiments. To avoid repetition, detailed descriptions are properly omitted herein.

In some embodiments, the terminal 4000 may further include a power supply 4005, configured to supply power to various components or circuits in the terminal.

In addition, to improve functions of the terminal, the terminal 4000 may further include one or more of an input unit 4006, a display unit 4007, an audio circuit 4008, a camera 4009, a sensor 4011, and the like. The audio circuit may further include a speaker 40081, a microphone 40082, and the like.

It should be understood that the processing apparatus 4004 or the processor 4001 may be a chip. For example, the processing apparatus 4004 or the processor 4001 may be a field programmable gate array (field programmable gate array, FPGA), may be a general-purpose processor, a digital signal processor (digital signal processor, DSP), an application specific integrated circuit (application specific integrated circuit, ASIC), the field programmable gate array (field programmable gate array, FPGA), another programmable logic device, a discrete gate, a transistor logic device, or a discrete hardware component, may be a system on chip (system on chip, SoC), may be a central processing unit (central processing unit, CPU), may be a network processor (network processor, NP), may be a digital signal processing circuit (digital signal processor, DSP), may be a micro controller unit (micro controller unit, MCU), or may be a programmable controller (programmable logic device, PLD) or another integrated chip. The general-purpose processor may be a microprocessor, or the processor may be any processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory (such as the memory 4003) in this application may be a volatile memory or a non-volatile memory, or may include both a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

Figure 12:
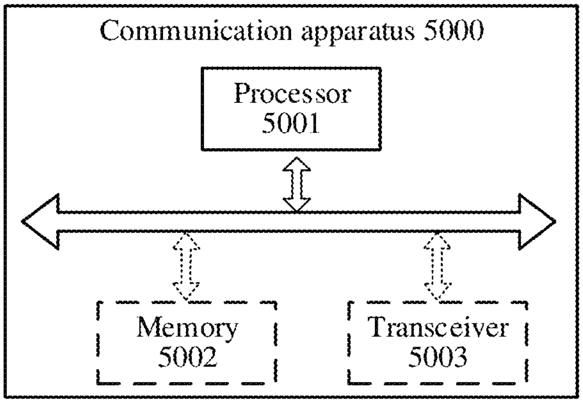
FIG. 12 is a schematic block diagram of a communication apparatus according to this application.

FIG. 12 is a schematic block diagram of a communication apparatus 5000 according to an embodiment of this application. Any network element in this application, such as an access network device, a first network element, or a terminal apparatus, may be implemented by the communication apparatus shown in FIG. 12.

It should be understood that the communication apparatus 5000 may be a physical device, may be a component (for example, an integrated circuit or a chip) of a physical device, or may be a functional module in a physical device.

As shown in FIG. 12, the communication apparatus 5000 includes one or more processors 5001. The processor 5001 may store executable instructions for performing the method in embodiments of this application. In some embodiments, the processor 5001 may invoke an interface to implement receiving and sending functions. The interface may be a logical interface or a physical interface. This is not limited. For example, the interface may be a transceiver circuit or an interface circuit. The transceiver circuits or the interface circuits configured to implement receiving and sending functions may be separated, or may be integrated together. The transceiver circuit or the interface circuit may be configured to read and write code/data, or the transceiver circuit or the interface circuit may be configured to transmit or transfer a signal.

In some embodiments, the interface may be implemented by using a transceiver. In some embodiments, the communication apparatus 5000 may further include a transceiver 5003. The transceiver 5003 may be referred to as a transceiver unit, a transceiver circuit, or the like, and is configured to implement receiving and sending functions.

In some embodiments, the communication apparatus 5000 may further include a memory 5002. A specific deployment location of the memory 5002 is not specifically limited in this embodiment of this application. The memory may be integrated into the processor, or may be independent of the processor. When the communication apparatus 5000 does not include a memory, the communication apparatus 5000 only needs to have a processing function, and the memory may be deployed at another location (for example, a cloud system).

The processor 5001, the memory 5002, and the transceiver 5003 communicate with each other through an internal connection path, to transmit a control signal and/or a data signal.

It may be understood that, although not shown, the communication apparatus 5000 may further include another apparatus, for example, an input apparatus, an output apparatus, or a battery.

In some embodiments, in some embodiments, the memory 5002 may store executable instructions for performing the method in embodiments of this application. The processor 5001 may execute the instructions stored in the memory 5002, to complete, in combination with other hardware (for example, the transceiver 5003), steps performed in the method shown in this specification. For specific working processes and beneficial effects, refer to descriptions in the method embodiments in this specification.

The method disclosed in embodiments of this application may be applied to the processor 5003, or may be implemented by the processor 5003. The processor 5003 may be an integrated circuit chip, and has a signal processing capability. In an implementation process, steps of the method may be implemented by using a hardware integrated logical circuit in the processor, or by using instructions in a form of software. The foregoing processor may be a general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, or a discrete hardware component. It may implement or perform the methods, steps, and logical block diagrams that are disclosed in embodiments of this application. The general-purpose processor may be a microprocessor, or the processor may be any processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory (random access memory, RAM), a flash memory, a read-only memory (read-only memory, ROM), a programmable read-only memory, an electrically erasable programmable memory, or a register. The storage medium is located in the memory, and the processor reads instructions in the memory and completes the steps in the foregoing methods in combination with hardware of the processor.

According to the methods provided in embodiments of this application, this application further provides a computer program product. The computer program product includes computer program code. When the computer program code is run on a computer, the computer is enabled to perform the method of any network element (for example, an access network device, a first network element, a terminal apparatus, or a unified data management network element) in any one of the foregoing method embodiments.

According to the methods provided in embodiments of this application, this application further provides a computer-readable medium. The computer-readable medium stores program code. When the program code is run on a computer, the computer is enabled to perform the method of any network element in any one of the foregoing method embodiments.

According to the methods provided in embodiments of this application, this application further provides a system. The system includes one or more of the following: an access network device, a session management network element, an access and mobility management network element, or a unified data management network element.

An embodiment of this application further provides a processing apparatus, including a processor and an interface. The processor is configured to perform the method in any one of the foregoing method embodiments.

It should be understood that the foregoing processing apparatus may be a chip. For example, the processing apparatus may be a field programmable gate array (field programmable gate array, FPGA), may be a general-purpose processor, a digital signal processor (digital signal processor, DSP), an application specific integrated circuit (application specific integrated circuit, ASIC), the field programmable gate array (field programmable gate array, FPGA), another programmable logic device, a discrete gate, a transistor logic device, or a discrete hardware component, may be a system on chip (system on chip, SoC), may be a central processing unit (central processing unit, CPU), may be a network processor (network processor, NP), may be a digital signal processing circuit (digital signal processor, DSP), may be a micro controller unit (micro controller unit, MCU), or may be a programmable controller (programmable logic device, PLD) or another integrated chip. It may implement or perform the methods, steps, and logical block diagrams that are disclosed in embodiments of this application. The general-purpose processor may be a microprocessor, or the processor may be any processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (digital video disc, DVD)), A semiconductor medium (for example, a solid state disc (solid state disc, SSD)), or the like.

Terms such as "component", "module", and "system" used in this specification indicate computer-related entities, hardware, firmware, combinations of hardware and software, software, or software being executed. For example, a component may be but is not limited to a process that is run on a processor, a processor, an object, an executable file, an execution thread, a program, or a computer. As illustrated by using figures, both an application running on a computing device and the computing device may be components. One or more components may reside within a process or an execution thread, and a component may be located on one computer or distributed between two or more computers. In addition, these components may be executed from various computer-readable media that store various data structures. For example, the components may communicate by using a local or remote process based on a signal having one or more data packets (for example, data from two components interacting with another component in a local system, in a distributed system, or across a network such as the Internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be understood that, in embodiments of this application, numbers "first", "second", and the like are merely for distinguishing between different objects, for example, to distinguish between different network devices, and do not constitute a limitation on the scope of embodiments of this application. Embodiments of this application are not limited thereto.

It should be further understood that, in this application, both "when" and "if" mean that a network element performs corresponding processing in an objective situation, but do not constitute a limitation on time, do not require that the network element has a determining action during implementation, and do not mean other limitations either.

It should be further understood that, in this application, "at least one" means one or more, and "a plurality of" means two or more.

It should be further understood that, in embodiments of this application, "B corresponding to A" indicates that B is associated with A, and B may be determined based on A. However, it should be further understood that determining B based on A does not mean that B is determined only based on A, and B may alternatively be determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the technology of some approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

obtaining, by a first network element, first reduced capability (REDCAP) information from a terminal apparatus;

obtaining, by the first network element, second REDCAP information that is subscribed by the terminal apparatus; and determining, by the first network element based on the first REDCAP information and the second REDCAP information, whether to allow the terminal apparatus to use a service corresponding to the first REDCAP information, wherein the first network element is an access and mobility management network element in a second network in a hand-over process in which the terminal apparatus is handed over from a first network to the second network, and the obtaining, by the first network element, the first REDCAP information from the terminal apparatus comprises:

receiving, by the first network element, the first REDCAP information from an access network device in the second network, wherein the first REDCAP information is determined by the access network device in the second network based on radio capability information of the terminal apparatus from an access network device in the first network.

2. The method according to claim 1, wherein the first REDCAP information is usable to indicate a REDCAP access technology and a first service type, and a first access technology usable for the first service type is the REDCAP access technology, the second REDCAP information is usable to indicate the REDCAP access technology subscribed by the terminal apparatus and at least one second service type, and a second access technology usable for the at least one second service type is the REDCAP access technology subscribed by the terminal apparatus.

3. The method according to claim 1, wherein the first REDCAP information is usable to indicate a first-type REDCAP access technology, the second REDCAP information is usable to indicate at least one type of REDCAP access technology subscribed by the terminal apparatus, and different types of REDCAP access technologies correspond to different service types.

4. The method according to claim 1, wherein the method further comprises:

sending, by the first network element, first indication information to the terminal apparatus, wherein the first indication information is usable to indicate to the terminal apparatus not to allow the terminal apparatus to use the service corresponding to the first REDCAP information.

5. The method according to claim 4, wherein the first indication information comprises a cause value, and the cause value is usable to indicate a reason the terminal apparatus is rejected.

6. The method according to claim 1, wherein the first network element is the access and mobility management network element, and the obtaining, by the first network element, the first REDCAP information from the terminal apparatus comprises:

receiving, by the first network element, a non-access stratum (NAS) message from the terminal apparatus, wherein the NAS message comprises the first REDCAP information; or receiving, by the first network element, the first REDCAP information from the access network device.

7. The method according to claim 6, wherein before the receiving, by the first network element, the first REDCAP information from the access network device, the method further comprises:

sending, by the first network element, the radio capability information of the terminal apparatus to the access network device, wherein the radio capability information is usable for the access network device to determine the first REDCAP information.

8. A communication method, comprising:

sending, by a terminal apparatus, first reduced capability (REDCAP) information; and receiving, by the terminal apparatus, indication information from a first network element based on the first REDCAP information, wherein the indication information is usable to indicate whether to allow the terminal apparatus to use a service corresponding to the first REDCAP information, wherein the indication information is determined based on the first REDCAP information and a second REDCAP information, the first network element is an access network device, and the method further comprises:

receiving, by the terminal apparatus, third indication information from the first network element, wherein the third indication information is usable to the terminal apparatus to indicate at least one of:

to store a timing advance (TA) value in a current radio resource control (RRC) connection setup process, and use the TA value during a next RRC connection setup;

to reduce a frequency of neighboring cell measurement; or to store a transmit power used in a current RRC connection setup process, and use the transmit power during a next RRC connection setup.

9. The method according to claim 8, wherein the method further comprises:

sending, by the terminal apparatus based on the indication information, adjusted REDCAP information, wherein the adjusted REDCAP information is different from the first REDCAP information.

10. The method according to claim 9, wherein the method further comprises:

receiving, by the terminal apparatus, broadcast information from the first network element, wherein the broadcast information comprises REDCAP access technology indication information and optimization indication information, the optimization information indication is usable to indicate whether the terminal apparatus whose access technology is a REDCAP access technology enables an optimization function based on the optimization indication information, and the optimization function comprises one or more of:

storing the timing advance (TA) value used in the current RRC connection setup process, and using the TA value during the next RRC connection setup;

reducing the frequency of neighboring cell measurement; or storing the transmit power used in the current RRC connection setup process, and using the transmit power during the next RRC connection setup.

11. A communication apparatus, comprising:

a processor, and a memory, wherein the processor is coupled to the memory, the memory is configured to store non-transitory instructions, and in response to the non-transitory instructions being executed by the processor, the communication apparatus is configured to perform:

sending first reduced capability (REDCAP) information; and receiving indication information from a first network element based on the first REDCAP information, wherein the indication information is usable to indicate whether to allow the terminal apparatus to use a service corresponding to the first REDCAP information, wherein the indication information is determined based on the first REDCAP information and a second REDCAP information, the first network element is an access network device, and the communication apparatus is further configured to perform:

receiving third indication information from the first network element, wherein the third indication information is usable to the terminal apparatus to indicate at least one of:

to store a timing advance (TA) value in a current radio resource control (RRC) connection setup process, and use the TA value during a next RRC connection setup;

to reduce a frequency of neighboring cell measurement; or to store a transmit power used in a current RRC connection setup process, and use the transmit power during a next RRC connection setup.

12. The communication apparatus according to claim 11, wherein the communication apparatus is further configured to perform:

sending, based on the indication information, adjusted REDCAP information, wherein the adjusted REDCAP information is different from the first REDCAP information.

* * * * *